US010640595B2

(12) United States Patent
Bartholomew et al.

(10) Patent No.: US 10,640,595 B2
(45) Date of Patent: May 5, 2020

(54) CONTROLLED ARCHITECTURE POLYMERIZATION WITH PHOTOINITIATOR GROUPS IN BACKBONE

(71) Applicant: Avery Dennison Corporation, Glendale, CA (US)

(72) Inventors: Eric L. Bartholomew, Mill Hall, PA (US); William L. Bottorf, Mill Hall, PA (US); Kyle R. Heimbach, Millmont, PA (US); Brandon S. Miller, Lock Haven, PA (US); Michael T. Waterman, Chardon, OH (US); Michael Zajaczkowski, Bellefonte, PA (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 15/793,449

(22) Filed: Oct. 25, 2017

(65) Prior Publication Data
US 2018/0112021 A1 Apr. 26, 2018

Related U.S. Application Data

(60) Provisional application No. 62/412,326, filed on Oct. 25, 2016.

(51) Int. Cl.
*C08F 220/18* (2006.01)
*C09J 153/00* (2006.01)
*C08F 293/00* (2006.01)
*C09J 7/38* (2018.01)

(52) U.S. Cl.
CPC ........ *C08F 220/18* (2013.01); *C08F 293/005* (2013.01); *C09J 7/387* (2018.01); *C09J 153/00* (2013.01); *C08F 2438/02* (2013.01)

(58) Field of Classification Search
CPC .............................. C09J 153/00; C08F 220/18
See application file for complete search history.

(56) References Cited

U.S. PATENT DOCUMENTS

| 3,697,402 A | 10/1972 | Clifton et al. |
| 3,993,549 A | 11/1976 | Bush et al. |
| 4,118,595 A | 10/1978 | Pfahni et al. |
| 4,232,058 A | 11/1980 | Dow et al. |
| 4,279,590 A | 7/1981 | Dow et al. |
| 4,291,087 A | 9/1981 | Warburton, Jr. |
| 4,713,273 A | 12/1987 | Freedman |
| 4,740,532 A | 4/1988 | May, Jr. et al. |
| 4,912,169 A | 3/1990 | Whitmire et al. |
| 4,916,184 A | 4/1990 | Clark |
| 4,948,819 A | 8/1990 | Green et al. |
| 4,952,711 A | 8/1990 | Jacobine et al. |
| 5,028,661 A | 7/1991 | Clark et al. |
| 5,096,963 A | 3/1992 | Blain |
| 5,102,924 A | 4/1992 | Williams et al. |
| 5,178,710 A | 1/1993 | Hikmet et al. |
| 5,217,654 A | 6/1993 | Buckley |
| 5,268,396 A | 12/1993 | Lai |
| 5,298,554 A | 3/1994 | Rehmer et al. |
| 5,324,078 A | 6/1994 | Bane |
| 5,358,976 A | 10/1994 | Dowling et al. |
| 5,585,415 A | 12/1996 | Gorzalski et al. |
| 5,683,741 A | 11/1997 | Seng et al. |
| 5,770,331 A | 6/1998 | Olsen et al. |
| 5,847,021 A | 12/1998 | Tortorello et al. |
| 5,894,050 A | 4/1999 | Camps et al. |
| 5,932,113 A | 8/1999 | Kurdi et al. |
| 6,008,264 A | 12/1999 | Ostler et al. |
| 6,014,488 A | 1/2000 | Shustack |
| 6,045,953 A | 4/2000 | Ohe et al. |
| 6,107,361 A | 8/2000 | Tortorello et al. |
| 6,344,532 B1 | 2/2002 | Kim et al. |
| 6,392,725 B1 | 5/2002 | Harada et al. |
| 6,432,475 B1 * | 8/2002 | Yamamoto .......... C08F 293/005 427/208.4 |
| 6,444,368 B1 | 9/2002 | Hikmet et al. |
| 6,514,373 B1 | 2/2003 | Hill et al. |

(Continued)

FOREIGN PATENT DOCUMENTS

| CN | 201480056971 | 10/2014 |
| CN | 105131849 | 12/2015 |

(Continued)

OTHER PUBLICATIONS

International Search Report and Written Opinion dated Jul. 9, 2015 issued in corresponding IA No. PCT/US2015/023591 filed Mar. 31, 2015.
International Preliminary Report on Patentability dated Oct. 4, 2016 issued in corresponding IA No. PCT/US2015/023591 filed Mar. 31, 2015.
International Search Report and Written Opinion dated Jul. 4, 2017 issued in corresponding IA No. PCT/US2017/018568 filed Feb. 20, 2017.
Invitation to Pay Additional Fees dated May 17, 2017 issued in corresponding IA No. PCT/US2017/018568 filed Feb. 20, 2017.

(Continued)

*Primary Examiner* — Jeffrey C Mullis

(57) ABSTRACT

Acrylic copolymers that include the controlled placement of particular functional groups within the polymer structure are provided. The copolymers comprise a first reactive segment of including a functional group selected from the group consisting of a UV active functional group, a reactive functional group, a non-reactive functional group, and combinations thereof and a second segment including a functional group selected from the group consisting of a reactive functional group, a non-reactive functional group, and combinations thereof. The acrylic copolymers are manufactured via a controlled radical polymerization process. The copolymers are useful in the manufacture of adhesives and elastomers.

74 Claims, 10 Drawing Sheets

(56) References Cited

U.S. PATENT DOCUMENTS

| | | |
|---|---|---|
| 6,517,661 B2 | 2/2003 | Hill et al. |
| 6,524,881 B1 | 2/2003 | Tandy et al. |
| 6,551,439 B1 | 4/2003 | Hill et al. |
| 6,624,915 B1 | 9/2003 | Kirkpatrick et al. |
| 6,632,535 B1 | 10/2003 | Buazza et al. |
| 6,636,291 B2 | 10/2003 | Van De Witte et al. |
| 6,649,259 B1 | 11/2003 | Hu et al. |
| 6,652,281 B1 | 11/2003 | Eckhardt et al. |
| 6,677,402 B2 | 1/2004 | Gaddam et al. |
| 6,692,978 B2 | 2/2004 | Tandy et al. |
| 6,734,032 B2 | 5/2004 | Tandy et al. |
| 6,743,852 B2 | 6/2004 | Dershem et al. |
| 6,767,974 B1 | 7/2004 | Keoshkerian et al. |
| 6,821,455 B2 | 11/2004 | Kornfield et al. |
| 6,836,371 B2 | 12/2004 | Lai et al. |
| 6,855,226 B2 | 2/2005 | Hill et al. |
| 6,897,915 B1 | 5/2005 | Lavrentovich et al. |
| 6,939,428 B2 | 9/2005 | Hill et al. |
| 7,008,675 B2 | 3/2006 | Kornfield et al. |
| 7,009,668 B2 | 3/2006 | Van De Witte et al. |
| 7,038,670 B2 | 5/2006 | Liang et al. |
| 7,074,295 B2 | 7/2006 | Bellafore et al. |
| 7,094,618 B2 | 8/2006 | Tandy et al. |
| 7,157,535 B2 | 1/2007 | Herr et al. |
| 7,176,044 B2 | 2/2007 | Forray et al. |
| 7,179,509 B2 | 2/2007 | Kornfield et al. |
| 7,229,517 B2 | 6/2007 | Bellafore et al. |
| 7,232,540 B2 | 6/2007 | Gould et al. |
| 7,232,595 B2 | 6/2007 | Coykendall et al. |
| 7,238,543 B2 | 7/2007 | Tandy et al. |
| 7,256,221 B2 | 8/2007 | Coykendall et al. |
| 7,271,947 B2 | 9/2007 | Liang et al. |
| 7,300,688 B2 | 11/2007 | Wilderbeek et al. |
| 7,339,579 B2 | 3/2008 | Richter et al. |
| 7,372,480 B1 | 5/2008 | Lavrentovich et al. |
| 7,517,925 B2 | 4/2009 | Dershem et al. |
| 7,528,404 B2 | 5/2009 | Musa et al. |
| 7,605,190 B2 | 10/2009 | Moszner et al. |
| 7,691,479 B2 | 4/2010 | Schmatloch et al. |
| 7,763,330 B2 | 7/2010 | Lub et al. |
| 7,781,493 B2 | 8/2010 | Baikerikar et al. |
| 7,786,183 B2 | 8/2010 | Baikerikar et al. |
| 7,795,364 B2 | 9/2010 | Herr et al. |
| 7,799,884 B2 | 9/2010 | Herr et al. |
| 7,806,016 B2 | 10/2010 | Shimizu et al. |
| 7,824,740 B2 | 11/2010 | Kawanishi et al. |
| 7,837,941 B2 | 11/2010 | Harding et al. |
| 7,851,254 B2 | 12/2010 | Forray et al. |
| 7,939,161 B2 | 5/2011 | Allam et al. |
| 7,940,000 B2 | 5/2011 | Koshiyama et al. |
| 7,955,696 B2 | 6/2011 | Baikerikar et al. |
| 7,956,151 B2 | 6/2011 | Schmatloch et al. |
| 7,978,302 B2 | 7/2011 | Peeters et al. |
| 8,022,437 B2 | 9/2011 | Koyama |
| 8,040,049 B2 | 10/2011 | Kimura et al. |
| 8,080,299 B2 | 12/2011 | Baikerikar et al. |
| 8,080,609 B2 | 12/2011 | Schmatloch |
| 8,083,321 B2 | 12/2011 | Krawczyk et al. |
| 8,147,974 B2 | 4/2012 | Baikerikar et al. |
| 8,183,305 B2 | 5/2012 | Neffgen et al. |
| 8,194,044 B2 | 6/2012 | Richter et al. |
| 8,236,480 B2 | 8/2012 | Locascio et al. |
| 8,273,801 B2 | 9/2012 | Baikerikar et al. |
| 8,298,368 B2 | 10/2012 | Schmatloch et al. |
| 8,304,061 B2 | 11/2012 | Feldman et al. |
| 8,349,410 B2 | 1/2013 | Huang et al. |
| 8,378,052 B2 | 2/2013 | Harvey et al. |
| 8,415,010 B2 | 4/2013 | Liu et al. |
| 8,420,704 B2 | 4/2013 | Hillmyer et al. |
| 8,735,506 B2 | 5/2014 | Hammond et al. |
| 8,808,811 B2 | 8/2014 | Kolb et al. |
| 9,012,127 B2 | 4/2015 | Bowman et al. |
| 9,469,794 B2 | 10/2016 | Liu et al. |
| 9,546,305 B2 | 1/2017 | Hammond et al. |
| 9,644,063 B2 | 5/2017 | Miller et al. |
| 2002/0098608 A1 | 7/2002 | Tandy et al. |
| 2002/0168501 A1 | 11/2002 | Sigel et al. |
| 2003/0003688 A1 | 1/2003 | Tandy et al. |
| 2003/0015688 A1 | 1/2003 | Hikmet |
| 2003/0059188 A1 | 3/2003 | Baker et al. |
| 2003/0096111 A1* | 5/2003 | Husemann ............ C08F 290/04 428/355 AC |
| 2003/0166985 A1 | 9/2003 | Patil et al. |
| 2004/0029044 A1 | 2/2004 | Severance et al. |
| 2004/0077744 A1 | 4/2004 | Naylor et al. |
| 2004/0082683 A1 | 4/2004 | Karim et al. |
| 2004/0161876 A1 | 8/2004 | Tandy et al. |
| 2004/0191420 A1 | 9/2004 | Rearick et al. |
| 2004/0257508 A1 | 12/2004 | Van de Witte et al. |
| 2005/0000643 A1 | 1/2005 | Bellafore et al. |
| 2005/0070655 A1 | 3/2005 | Van Den Bergen et al. |
| 2005/0119366 A1 | 6/2005 | Moy et al. |
| 2005/0136077 A1 | 6/2005 | Yahiaoui et al. |
| 2005/0165164 A1 | 7/2005 | Moeller et al. |
| 2005/0174412 A1 | 8/2005 | Codos et al. |
| 2005/0208285 A1 | 9/2005 | Lyons et al. |
| 2005/0250906 A1 | 11/2005 | Husemann |
| 2006/0079011 A1 | 4/2006 | Tandy et al. |
| 2006/0086448 A1 | 4/2006 | Verstegen et al. |
| 2006/0142408 A1 | 6/2006 | Liu et al. |
| 2006/0229377 A1 | 10/2006 | Bublewitz et al. |
| 2007/0072098 A1 | 3/2007 | Hikmet |
| 2007/0077402 A1 | 4/2007 | Sigel et al. |
| 2007/0179240 A1 | 8/2007 | Chalmers et al. |
| 2007/0187656 A1 | 8/2007 | Evans et al. |
| 2007/0249794 A1 | 10/2007 | Evans et al. |
| 2007/0257238 A1 | 11/2007 | Misura et al. |
| 2007/0258238 A1 | 11/2007 | Handsaker |
| 2007/0265391 A1 | 11/2007 | Yang et al. |
| 2007/0295616 A1 | 12/2007 | Harding et al. |
| 2008/0054171 A1 | 3/2008 | Bonn et al. |
| 2008/0093776 A1 | 4/2008 | Williams |
| 2008/0094556 A1 | 4/2008 | Van Der Zande et al. |
| 2008/0106002 A1 | 5/2008 | Feldman et al. |
| 2008/0214712 A1 | 9/2008 | Passade et al. |
| 2008/0250130 A1 | 10/2008 | Li et al. |
| 2008/0311404 A1 | 12/2008 | Diggins |
| 2008/0312354 A1 | 12/2008 | Krawczyk et al. |
| 2009/0015771 A1 | 1/2009 | Hikmet et al. |
| 2009/0015930 A1 | 1/2009 | Hikmet et al. |
| 2009/0093584 A1 | 4/2009 | Gelles et al. |
| 2009/0096136 A1 | 4/2009 | Hawker et al. |
| 2009/0208553 A1 | 8/2009 | Kemp et al. |
| 2009/0288771 A1 | 11/2009 | Farrell et al. |
| 2010/0068231 A1 | 3/2010 | Favre et al. |
| 2010/0109317 A1 | 5/2010 | Hoffmuller |
| 2010/0215659 A1 | 8/2010 | Ladet |
| 2010/0255239 A1 | 10/2010 | Hammond et al. |
| 2011/0026118 A1 | 2/2011 | Seesselberg et al. |
| 2011/0111350 A1 | 5/2011 | Lakshmi et al. |
| 2011/0118372 A1 | 5/2011 | Lester et al. |
| 2011/0319558 A1 | 12/2011 | Rehnberg et al. |
| 2012/0021134 A1 | 1/2012 | Kolb et al. |
| 2012/0277341 A1 | 11/2012 | Smith et al. |
| 2013/0059971 A1 | 3/2013 | Miller et al. |
| 2013/0081687 A1 | 4/2013 | Wu et al. |
| 2013/0094789 A1 | 4/2013 | Hoffman et al. |
| 2013/0103157 A1 | 4/2013 | Kourtis et al. |
| 2013/0109262 A1 | 5/2013 | Zhou |
| 2013/0237626 A1 | 9/2013 | Bishop et al. |
| 2014/0008319 A1 | 1/2014 | Buxton-Dakides |
| 2014/0061027 A1 | 3/2014 | Polwart et al. |
| 2014/0065325 A1 | 3/2014 | Guo et al. |
| 2014/0066539 A1 | 3/2014 | Tobing et al. |
| 2014/0158296 A1 | 6/2014 | Wigdorski et al. |
| 2014/0228463 A1 | 8/2014 | Gupta et al. |
| 2014/0329958 A1 | 11/2014 | Lester et al. |
| 2014/0360975 A1 | 12/2014 | Hustad et al. |
| 2015/0105488 A1 | 4/2015 | Madsen et al. |
| 2015/0152298 A1 | 6/2015 | Krepski et al. |
| 2015/0299475 A1 | 10/2015 | Porosa et al. |
| 2016/0023980 A1 | 1/2016 | Chisholm et al. |
| 2016/0168298 A1* | 6/2016 | Woods ................. C08F 265/06 522/46 |

(56) References Cited

U.S. PATENT DOCUMENTS

| | | | |
|---|---|---|---|
| 2016/0289513 | A1 | 10/2016 | Behling et al. |
| 2017/0174902 | A1 | 6/2017 | Epple et al. |
| 2018/0243463 | A1* | 8/2018 | Chatterjee ......... A61F 13/00068 |

FOREIGN PATENT DOCUMENTS

| | | |
|---|---|---|
| DE | 102005043222 | 3/2007 |
| EP | 1130070 | 8/2002 |
| EP | 1477511 | 11/2004 |
| EP | 1595930 | 11/2005 |
| GB | 2491643 | 12/2012 |
| JP | 10-147632 | 6/1998 |
| JP | 2012-072235 | 4/2012 |
| JP | 2014-517095 | 7/2014 |
| JP | 2014-152294 | 8/2014 |
| JP | 2014-213572 | 11/2014 |
| KR | 2013-0130927 | 12/2013 |
| WO | 01/94211 | 6/2002 |
| WO | 2005/119366 | 12/2006 |
| WO | 2008/052131 | 5/2008 |
| WO | 2009/117654 | 9/2009 |
| WO | 2012/126724 | 9/2012 |
| WO | 2015/143290 | 9/2015 |
| WO | 2016/100251 | 6/2016 |
| WO | 2016/177861 | 11/2016 |
| WO | 2016/179076 | 11/2016 |

OTHER PUBLICATIONS

Rudolph et al., "Selective crosslinking or addressing of individual domains within block copolymer nanostructures," European Polymer Journal 80, 2016, pp. 317-331.

An et al., "Multifunctional Linear Methacrylate Copolymer Polyenes Having Pendant Vinyl Groups: Synthesis and Photoinduced Thiol-Ene Crosslinking Polyaddition," Journal of Polymer Science, Part A: Polymer Chemistry, 2014, 52, pp. 572-581.

DiPasquale et al., "Controlled architecture for improved macromolecular memory within polymer networks." Current Opinion in Biotechnology. 2016. 40, pp. 170-176.

International Search Report and Written Opinion dated Jan. 23, 2018 issued in corresponding IA No. PCT/US2017/058284 filed Oct. 25, 2017.

International Preliminary Report on Patentability dated Jul. 10, 2018 issued in corresponding IA No. PCT/US2017/018568 filed Feb. 20, 2017.

Invitation to Restrict or Pay Additional Fees of the IPEA dated Mar. 13, 2018 issued in corresponding IA No. PCT/US2017/018568 filed Feb. 20, 2017.

Written Opinion of the IPEA dated Apr. 26, 2018 issued in corresponding IA No. PCT/US2017/018568 filed Feb. 20, 2017.

International Search Report dated Mar. 11, 2019 issued in corresponding IA No. PCT/US2018/066510 filed Dec. 19, 2018.

International Preliminary Report on Patentability dated Apr. 30, 2019 issued in corresponding IA No. PCT/US2017/058284 filed Oct. 25, 2017.

* cited by examiner

CONTROLLED ARCHITECTURE POLYMERIZATION WITH PHOTOINITIATOR GROUPS IN BACKBONE

CROSS-REFERENCE TO RELATED APPLICATION

The present application claims the benefit of U.S. Provisional Patent Application No. 62/412,326 filed Oct. 25, 2016, which is incorporated herein by reference in its entirety.

BACKGROUND

The subject matter relates to acrylic polymers, and in particular, to acrylic copolymers that include controlled placement of reactive functional groups within the polymer structure. The copolymers are useful in the manufacture of adhesives and elastomers.

(Meth)acrylic (co)polymers have been studied and used industrially for more than 50 years. Due to a wide range of monomers, (meth)acrylic (co)polymers display a significant array of viscoelastic properties that lend themselves well to applications in adhesives and elastomers. When compared to other copolymers that are used for similar purposes as (meth)acrylics, several significant advantages of (meth)acrylics become apparent. For example, relative to natural rubber and styrene block copolymers (meth)acrylic copolymers have superior optical clarity, UV stability, and temperature and oxidative resistance. State of the art (meth)acrylic copolymers meet many performance characteristics by virtue of their high molecular weight and crosslinking reactions. Because of the wide array of copolymerizable monomers, (meth)acrylic polymers have tailorable polarity and the ability to undergo a variety of crosslinking reactions. Typically, high performance (meth)acrylic copolymers are processed with large amounts of organic solvents.

Increasingly, there are significant economic and regulatory pressures for producers of solvent acrylic polymers to reduce the use of organic solvents in their processes. In particular, it is common for solvent acrylic polymers in adhesive applications to be coated from solutions averaging only 30-40% polymer. The solvent has to be evaporated and then either collected or incinerated, all of which are energy intensive and costly operations. Additionally, removal of solvent from thick adhesive films may produce defects in the dry adhesive film.

Control of polymer architecture is often the subject of intensive research with the goal of improving performance for ever increasingly challenging applications. Architectures that acrylic polymers are known to possess include block copolymers, telechelic polymers, and random polymers of controlled molecular weight. Even though advances in controlling architecture have occurred with many benefits, each of these particular architectural types has disadvantages. For example, block copolymers have high melt viscosities which require high processing temperatures, making it difficult to control reactivity of functional groups. The production of telechelic polymers often involves multiple steps. Telechelics involve the placement of a reactive functional group exclusively on the end terminus of a polymer and not elsewhere in the polymer backbone. Functional groups placed at the end termini of polymers serve solely to increase the linear molecular weight in a manner in which free polymer chain ends are eliminated. As a result, telechelic polymers can yield high strength materials but do not provide the viscoelastic properties critical to adhesives and some elastomer applications. Random polymers of controlled molecular weight require high amounts of crosslinking to attain network formation.

In the past 15-20 years a variety of controlled radical polymerization techniques have been developed to afford good architectural control of (meth)acrylic monomers. These techniques typically are tolerant to a wide variety of monomers and functional groups as opposed to previous techniques like anionic or group transfer polymerization. A substantial amount of fundamental research has been performed to understand these types of polymerization and a thorough review has been edited by Matyjewski. Reversible addition fragmentation chain transfer (RAFT) polymerization is one such technique that has been shown to work exceedingly well with a wide variety of (meth)acrylic monomers yielding excellent control of molecular weight and polydispersity. The RAFT mechanism for controlled polymerization is well understood and reported extensively. While some examples of controlled architecture acrylic PSAs have been reported, very little work has been done to explore the influence of reactive functional group placement.

SUMMARY

The present subject matter addresses problems associated with previously known architectured polymers by placement of crosslinkable monomers into segments of the polymer of controlled molecular weight and position. The overall molecular weight is low which yields desirable low viscosity, high solids solutions and melts. In conjunction with good processability, high performance elastomers and adhesives are obtained upon crosslinking. In particular, the crosslinkable monomers are placed in specific segments of the polymer backbone so that the crosslink density is controlled for optimal performance. The compositions of the present subject matter contain no undesired heterogeneity prior to crosslinking. A further benefit is that in all embodiments of the subject matter, the polymer chain ends are preserved to yield desired visco-elastic and surface properties. To control the placement of crosslinkable monomers, it is preferred to employ a controlled free radical polymerization technique. In contrast with standard free radical processes it is now possible to control the placement of crosslinkable monomers.

The present subject matter provides an acrylic block copolymer composition comprising at least one of an (A-B) diblock copolymer, (A-B-A) triblock copolymer, an -(A-B)$_n$- multiblock copolymer, and combinations thereof, whereby A is a first reactive segment and B is a second reactive segment. The present subject matter also provides a pressure sensitive adhesive derived from an acrylic block copolymer composition comprising at least one of an (A-B) diblock copolymer, (A-B-A) triblock copolymer, an -(A-B)$_n$- multiblock copolymer, and combinations thereof, whereby A is a first reactive segment and B is a second reactive segment. The present subject matter further provides a method of preparing an acrylic block copolymer (and/or a method of preparing a pressure sensitive adhesive derived from an acrylic block copolymer composition) comprising at least one of an (A-B) diblock copolymer, (A-B-A) triblock copolymer, an -(A-B)$_n$- multiblock copolymer, and combinations thereof, whereby A is a first reactive segment and B is a second reactive segment. The present subject matter also provides use of an acrylic block copolymer (and/or a pressure sensitive adhesive derived from an acrylic block copolymer) composition comprising at least one of an (A-B) diblock copolymer, (A-B-A) triblock copolymer, an -(A-B)$_n$- multiblock copolymer, and combinations thereof, whereby A is a first reactive segment and B is a second reactive segment.

In one aspect, the present subject matter provides an acrylic polymer comprising at least one acrylic block copolymer including (i) a first reactive segment of controlled molecular weight and position that includes at least one monomer having a functional group selected from the group consisting of a UV active functional group, a reactive functional group, a non-reactive functional group, and combinations thereof, and (ii) a second segment of controlled molecular weight and position that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. In some embodiments, the first reactive segment includes at least one monomer having a UV active functional group, at least one monomer having a reactive functional group, and at least one monomer having a non-reactive functional group. The second segment includes at least one monomer having a reactive functional group and at least one monomer having a non-reactive functional group. In other embodiments, the first reactive segment includes at least one monomer having a UV active functional group and at least one monomer having a non-reactive functional group. The second segment includes at least one monomer having a non-reactive functional group or at least one monomer having only a non-reactive functional group. The second segment is non-reactive with the UV active functional group or the reactive functional group. The at least one monomer having a non-reactive functional group is non-reactive with the UV active functional group and/or the reactive functional group. The first reactive segment and the second segment may be positioned adjacent to the polymer chain ends. The reactive functional groups and/or the non-reactive functional groups may be spaced apart along the length of the polymer chain. That is, the reactive functional groups and/or the non-reactive functional groups are spaced apart along the length of the first reactive segment and/or along the length of the second segment. The reactive functional groups and/or the non-reactive functional groups may be randomly spaced apart along the length of the polymer chain. That is, the reactive functional groups and/or the non-reactive functional groups may be randomly spaced apart along the length of the first reactive segment and/or along the length of the second segment. The at least one monomer having a UV active functional group is about 10% or less, or about 5% or less, or about 4% or less, or about 3% or less by weight of the total polymer weight. The first reactive segment comprises 40% or less, 30% or less, 20% or less, 10% or less, 5% or less, or 3% or less of the total polymer molecular weight. The first reactive segment(s) include about 40% to about 99%, or about 45% to about 99%, or about 0% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The functional groups of the first reactive segment and the second segment are capable of undergoing crosslinking reactions. The first reactive segment and the second segment are molecularly miscible before cure as expressed by their properties in the bulk state that are indicative of a single phase behavior or a single phase polymer. That is, the acrylic polymer is a single phase polymer prior to crosslinking. The acrylic polymer is a homogeneous polymer prior to crosslinking. The acrylic polymer is a homogeneous polymer at room temperature.

In some embodiments, the acrylic polymer is a single phase polymer at room temperature.

In another embodiment, the acrylic polymer is a single phase liquid polymer prior to crosslinking.

In yet another embodiment, the acrylic polymer is a single phase liquid polymer at room temperature.

In still another embodiment, the acrylic polymer is a homogeneous polymer prior to crosslinking.

In yet another embodiment, the acrylic polymer is a homogeneous polymer at room temperature.

In certain embodiments, the acrylic polymer is a homogeneous liquid polymer prior to crosslinking.

In some embodiments, the acrylic polymer is a homogeneous liquid polymer at room temperature.

In another embodiment, the acrylic polymer is a liquid polymer prior to crosslinking.

In yet another embodiment, the acrylic polymer is a liquid polymer at room temperature.

In still another embodiment, the acrylic polymer exhibits no heterogeneity prior to crosslinking.

In yet another embodiment, the acrylic polymer exhibits no heterogeneity at room temperature.

In another aspect, the present subject matter provides an acrylic polymer comprising at least one acrylic block copolymer including two first reactive segments A of controlled molecular weight and position and one second segment B of controlled molecular weight and position, wherein the first reactive segments A is positioned on either side of a middle second segment B on the polymer chain to define an ABA structure. The first reactive segments A includes at least one monomer having a functional group selected from the group consisting of a UV active functional group, a reactive functional group, a non-reactive functional group, and combinations thereof. The second segment B includes at least one monomer having a functional group selected from the group consisting of a reactive functional group, a non-reactive functional group, and combinations thereof. The reactive functionalities in the first reactive segment A and the second segment B may be the same or different from one another. The non-reactive functionalities in the first reactive segment A and the second segment B may be the same or different from one another. In some embodiments, the first reactive segment includes at least one monomer having a UV active functional group, at least one monomer having a reactive functional group, and at least one monomer having a non-reactive functional group. The second segment includes at least one monomer having a reactive functional group and at least one monomer having a non-reactive functional group. In other embodiments, the first reactive segment includes at least one monomer having a UV active functional group and at least one monomer having a non-reactive functional group. The second segment includes at least one monomer having a having a non-reactive functional group or at least one monomer having only a non-reactive functional group. The second segment is non-reactive with the UV active functional group or the reactive functional group. The at least one monomer having a non-reactive functional group is non-reactive with the UV active functional group and/or the reactive functional group. The first reactive segments are positioned adjacent to the polymer chain ends. The reactive functional groups and/or the non-reactive functional groups may be spaced apart along the length of the polymer chain. That is, the reactive functional groups and/or the non-reactive functional groups may be spaced apart along the length of the first reactive segment and/or along the length of the second segment. The reactive functional groups and/or the non-reactive functional groups may be randomly spaced apart along the length of the polymer chain. That is, the reactive functional groups and/or the non-reactive functional groups may be randomly spaced apart along the length of the first reactive segment and/or along the length of the second segment. The at least one monomer having a UV active functional group is about 10% or less, or about 5% or less, or about 4% or less, or about 3% or less by weight of the total polymer weight. The first reactive segment comprises 40% or less, 30% or less, 20% or less, 10% or less, 5% or less, or 3% or less of the total polymer molecular weight. The first reactive segment(s) include about 40% to about 99%, or about 45% to about 99%, or about 50% to about 99%, or about 55% go about 99%, or about 60% to about 99%, or about 65% go about 99%, or about 70% to about 99%, or about 75% go about 99%, or about 80% to about 99%, or about 85% to about 99%, or about 90% to about 99%, or about 95% to about 99% by weight of one or more non-reactive monomers. The functional groups of the first reactive segment and the second segment are capable of undergoing crosslinking reactions. The first reactive segments A and the second segment B are molecularly miscible before cure as expressed by their properties in the bulk state that are indicative of a single phase behavior or a single phase polymer. That is, the acrylic polymer is a single phase polymer prior to crosslinking. The acrylic polymer is a homogeneous polymer prior to crosslinking. The acrylic polymer is a homogeneous polymer at room temperature.

In some embodiments, the acrylic polymer is a single phase polymer at room temperature. In another embodiment, the acrylic polymer is a single phase liquid polymer prior to crosslinking. In yet another embodiment, the acrylic polymer is a single phase liquid polymer at room temperature. In certain embodiments, the acrylic polymer is a homogeneous liquid polymer prior to crosslinking. In some embodiments, the acrylic polymer is a homogeneous liquid polymer at room temperature. In another embodiment, the acrylic polymer is a liquid polymer prior to crosslinking. In yet another embodiment, the acrylic polymer is a liquid polymer at room temperature. In still another embodiment, the acrylic polymer exhibits no heterogeneity prior to crosslinking. In yet another embodiment, the acrylic polymer exhibits no heterogeneity at room temperature.

In another aspect, the present subject matter provides an acrylic polymer comprising two second segments B and one first reactive segment A, wherein the segments B may be positioned on either side of the middle segment A on the polymer chain to define a BAB structure.

In another aspect, the present subject matter provides a pressure sensitive adhesive composition comprising at least one acrylic block copolymer including (i) a first reactive segment of controlled molecular weight and position that includes at least one monomer having a functional group selected from the group consisting of a UV active functional group, a reactive functional group, a non-reactive functional group, and combinations thereof, and (ii) a second segment of controlled molecular weight and position that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. In some embodiments, the first reactive segment includes at least one monomer having a UV active functional group, at least one monomer having a reactive functional group, and at least one monomer having a non-reactive functional group. The second segment includes at least one monomer having a reactive functional group and at least one monomer having a non-reactive functional group. In other embodiments, the first reactive segment includes at least one monomer having a UV active functional group and at least one monomer having a non-reactive functional group. The second segment includes at least one monomer having a having a non-reactive functional group or at least one monomer having only a non-reactive functional group. The second segment is non-reactive with the UV active functional group or the reactive functional group. The at least one monomer having a non-reactive functional group is non-reactive with the UV active functional group and/or the reactive functional group. The first reactive segment and the second segment may be positioned adjacent to the polymer chain ends. The reactive functional groups and/or the non-reactive functional groups may be spaced apart along the length of the polymer chain. That is, the reactive functional groups and/or the non-reactive functional groups may be spaced apart along the length of the first reactive segment and/or along the length of the second segment. The reactive functional groups and/or the non-reactive functional groups may be randomly spaced apart along the length of the polymer chain. That is, the reactive functional groups and/or the non-reactive functional groups may be randomly spaced apart along the length of the first reactive segment and/or along the length of the second segment. The at least one monomer having a UV active functional group is about 10% or less, or about 5% or less, or about 4% or less, or about 3% or less by weight of the total polymer weight. The first reactive segment comprises 40% or less, 30% or less, 20% or less, 10% or less, 5% or less, or 3% or less of the total polymer molecular weight. The first reactive segment(s) include about 40% to about 99%, or about 45%© to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The functional groups of the first reactive segment and the second segment are capable of undergoing crosslinking reactions. The first reactive segment and the second segment are molecularly miscible before cure as expressed by their properties in the bulk state that are indicative of a single phase behavior or a single phase polymer. That is, the acrylic polymer is a single phase polymer prior to crosslinking. The acrylic polymer is a homogeneous polymer prior to crosslinking. The acrylic polymer is a homogeneous polymer at room temperature.

In some embodiments, the acrylic polymer is a single phase polymer at room temperature. In another embodiment, the acrylic polymer is a single phase liquid polymer prior to crosslinking. In yet another embodiment, the acrylic polymer is a single phase liquid polymer at room temperature. In certain embodiments, the acrylic polymer is a homogeneous liquid polymer prior to crosslinking. In some embodiments, the acrylic polymer is a homogeneous liquid polymer at room temperature. In another embodiment, the acrylic polymer is a liquid polymer prior to crosslinking. In yet another embodiment, the acrylic polymer is a liquid polymer at room temperature. In still another embodiment, the acrylic polymer exhibits no heterogeneity prior to crosslinking. In yet another embodiment, the acrylic polymer exhibits no heterogeneity at room temperature.

A widely acceptable quantitative description of a pressure sensitive adhesive (PSA) is given by the Dahlquist criterion, which indicates that materials having an elastic modulus (G') of less than $3 \times 10^6$ dynes/cm$^2$ (i.e., $3 \times 10^5$ Pa) on a 1-s time scale at the test temperature have PSA properties while materials having a G' in excess of this value do not. Empirically, it was found that materials that exhibit pressure sensitivity are those that are sufficiently soft, exhibiting an elastic modulus of less than $3 \times 10^5$ Pa ($3 \times 10^6$ dyn/cm$^2$) on a 1-s time scale at the test temperature. This somewhat surprising but well accepted empirical criterion was first established by Dahlquist and is commonly referred as the "Dahlquist criterion". Exemplary PSAs of the instant application shown in FIG. 12 display plateau elastic/storage modulus (G') of less than $3 \times 10^6$ dynes/cm$^2$ (i.e., $3 \times 10^5$ Pa) at room temperature indicating that the adhesives contemplated in the instant application are PSAs.

In still another aspect, the present subject matter provides a method of preparing a pressure sensitive adhesive composition comprising polymerizing using a controlled radical polymerization process at least one monomer having a functional group selected from the group consisting of a UV active functional group, a reactive functional group, a non-reactive functional group, and combinations thereof to thereby form a first reactive segment of controlled molecular weight and position. The method also comprises polymerizing using a controlled radical polymerization process at least one monomer having a functional group selected from the group consisting of a reactive functional group, a non-reactive functional group, and combinations thereof to thereby form a second segment of controlled molecular weight and position. The reactive functionalities in the first reactive segment and the second segment may be the same or different from one another. The non-reactive functionalities in the first reactive segment and the second segment may be the same or different from one another. In some embodiments, the first reactive segment includes at least one monomer having a UV active functional group, at least one monomer having a reactive functional group, and at least one monomer having a non-reactive functional group. The second segment includes at least one monomer having a reactive functional group and at least one monomer having a non-reactive functional group. In other embodiments, the first reactive segment includes at least one monomer having a UV active functional group and at least one monomer having a non-reactive functional group. The second segment includes at least one monomer having a having a non-reactive functional group or at least one monomer having only a non-reactive functional group. The second segment is non-reactive with the UV active functional group or the reactive functional group. The at least one monomer having a non-reactive functional group is non-reactive with the UV active functional group and/or the reactive functional group. The first reactive segment and the second segment may be positioned adjacent to the polymer chain ends. The reactive functional groups and/or the non-reactive functional groups may be spaced apart along the length of the polymer chain. That is, the reactive functional groups and/or the non-reactive functional groups may be spaced apart along the length of the first reactive segment and/or along the length of the second segment. The reactive functional groups and/or the non-reactive functional groups may be randomly spaced apart along the length of the polymer chain. That is, the reactive functional groups and/or the non-reactive functional groups may be randomly spaced apart along the length of the first reactive segment and/or along the length of the second segment. The at least one monomer having a UV active functional group is about 10% or less, or about 5% or less, or about 4% or less, or about 3% or less by weight of the total polymer weight. The first reactive segment comprises 40% or less, 30% or less, 20% or less, 10% or less, 5% or less, or 3% or less of the total polymer molecular weight. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The functional groups of the first reactive segment and the second segment are capable of undergoing crosslinking reactions. At least one of the first reactive segment and the second segment includes an acrylate group. The method also comprises forming an acrylic polymer from the first reactive segment and the second segment. The method additionally comprises crosslinking the acrylic polymer by mixing the acrylic polymer with an amount of a crosslinking agent. The first reactive segment and the second segment are molecularly miscible before cure as expressed by their properties in the bulk state that are indicative of a single phase behavior or a single phase polymer. That is, the acrylic polymer is a single phase polymer prior to crosslinking. The acrylic polymer is a homogeneous polymer prior to crosslinking. The acrylic polymer is a homogeneous polymer at room temperature.

In some embodiments, the acrylic polymer is a single phase polymer at room temperature. In another embodiment, the acrylic polymer is a single phase liquid polymer prior to crosslinking. In yet another embodiment, the acrylic polymer is a single phase liquid polymer at room temperature. In certain embodiments, the acrylic polymer is a homogeneous liquid polymer prior to crosslinking. In some embodiments, the acrylic polymer is a homogeneous liquid polymer at room temperature. In another embodiment, the acrylic polymer is a liquid polymer prior to crosslinking. In yet another embodiment, the acrylic polymer is a liquid polymer at room temperature. In still another embodiment, the acrylic polymer exhibits no heterogeneity prior to crosslinking. In yet another embodiment, the acrylic polymer exhibits no heterogeneity at room temperature.

In yet another aspect, the present subject matter provides an adhesive article comprising a substrate and an adhesive disposed on the substrate. The adhesive includes at least one acrylic block copolymer having (i) a first reactive segment of controlled molecular weight and position that includes at least one monomer having a functional group selected from the group consisting of a UV active functional group, a reactive functional group, a non-reactive functional group, and combinations thereof, and (ii) a second segment of controlled molecular weight and position that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. In some embodiments, the first reactive segment includes at least one monomer having a UV active functional group, at least one monomer having a reactive functional group, and at least one monomer having a non-reactive functional group. The second segment includes at least one monomer having a reactive functional group and at least one monomer having a non-reactive functional group. In other embodiments, the first reactive segment includes at least one monomer having a UV active functional group and at least one monomer having a non-reactive functional group. The second segment includes at least one monomer having a having a non-reactive functional group or at least one monomer having only a non-reactive functional group. The second segment is non-reactive with the UV active functional group or the reactive functional group. The at least one monomer having a non-reactive functional group is non-reactive with the UV active functional group and/or the reactive functional group. The first reactive segment and the second segment may be positioned adjacent to the polymer chain ends. The reactive functional groups and/or the non-reactive functional groups are spaced apart along the length of the polymer chain. That is, the reactive functional groups and/or the non-reactive functional groups may be spaced apart along the length of the first reactive segment and/or along the length of the second segment. The reactive functional groups and/or the non-reactive functional groups may be randomly spaced apart along the length of the polymer chain. That is, the reactive functional groups and/or the non-reactive functional groups may be randomly spaced apart along the length of the first reactive segment and/or along the length of the second segment. The at least one monomer having a UV active functional group is about 10% or less, or about 5% or less, or about 4% or less, or about 3% or less by weight of the total polymer weight. The first reactive segment comprises 40% or less, 30% or less, 20% or less, 10% or less, 5% or less, or 3% or less of the total polymer molecular weight. The first reactive segment(s) include about 40% to about 99%, or about 45% to about 99%, or about 50% go about 99%, or about 55% to about 99%, or about 60% to about 99%, or about 65% go about 99%, or about 70% to about 99%, or about 75% to about 99%, or about 80% to about 99%, or about 85% to about 99%, or about 90% to about 99%, or about 95% to about 99% by weight of one or more non-reactive monomers. The functional groups of the first reactive segment and the second segment are capable of undergoing crosslinking reactions. The first reactive segment and the second segment are molecularly miscible before cure as expressed by their properties in the bulk state that are indicative of a single phase behavior or a single phase polymer. That is, the acrylic polymer is a single phase polymer prior to crosslinking. The acrylic polymer is a homogeneous polymer prior to crosslinking. The acrylic polymer is a homogeneous polymer at room temperature.

In some embodiments, the acrylic polymer is a single phase polymer at room temperature. In another embodiment, the acrylic polymer is a single phase liquid polymer prior to crosslinking. In yet another embodiment, the acrylic polymer is a single phase liquid polymer at room temperature. In still another embodiment, the acrylic polymer is a homogeneous polymer prior to crosslinking. In yet another embodiment, the acrylic polymer is a homogeneous polymer at room temperature. In certain embodiments, the acrylic polymer is a homogeneous liquid polymer prior to crosslinking. In some embodiments, the acrylic polymer is a homogeneous liquid polymer at room temperature. In another embodiment, the acrylic polymer is a liquid polymer prior to crosslinking. In yet another embodiment, the acrylic polymer is a liquid polymer at room temperature. In still another embodiment, the acrylic polymer exhibits no heterogeneity prior to crosslinking. In yet another embodiment, the acrylic polymer exhibits no heterogeneity at room temperature.

As used herein, room temperature is from about 15° to about 25° C. As used herein, the term "liquid at room temperature" means a polymer that undergoes a degree of cold flow at room temperature. Cold flow is the distortion, deformation or dimensional change that takes place in materials under continuous load at temperatures within the working range. Cold flow is not due to heat softening.

DETAILED DESCRIPTION

Figure 1:
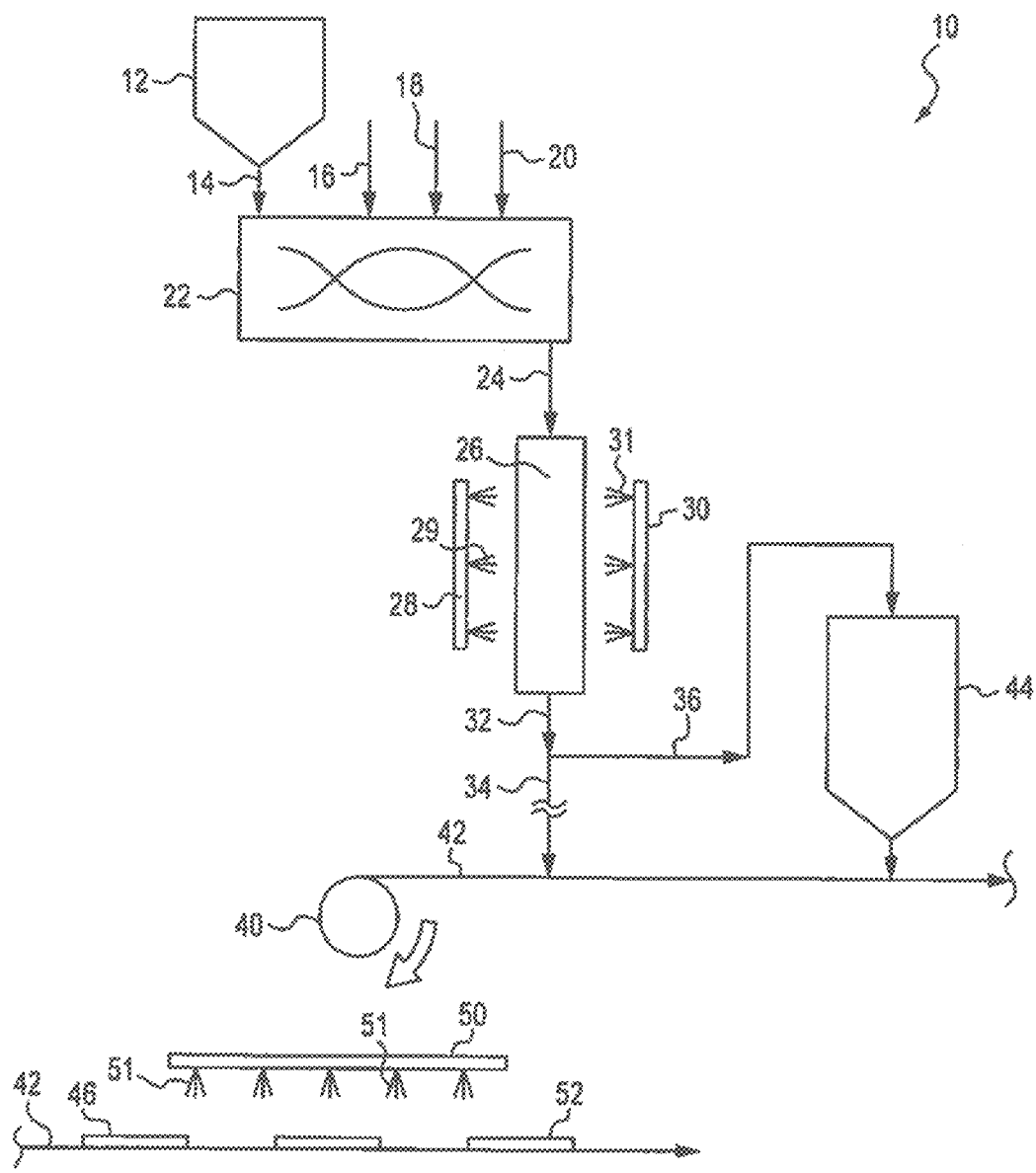
FIG. 1 is a process schematic diagram showing a representative process and system for producing an adhesive in accordance with the present subject matter.

As used herein, terms such as "typically" are not intended to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

As used herein, the terms "comprise(s)," "include(s)," "having," "has," "contain(s)," and variants thereof, are intended to be open-ended transitional phrases, terms, or words that do not preclude the possibility of additional acts or structure.

As used herein, the term "polymer" may refer to a polymeric compound prepared by polymerizing monomers, whether of the same or a different type. The generic term "polymer" embraces the terms "homopolymer," "copolymer", and the like.

Acrylic copolymers prepared by sequential polymerization of polymer segments from various monomers are provided. In certain embodiments, the copolymers contain a first reactive segment at a polymer chain end and at least one other or a second segment at another polymer chain end. The first reactive segment includes at least one functional group that is capable of undergoing a crosslinking reaction. The second segment may also include at least one functional group that is capable of undergoing a crosslinking reaction. The reactive segments have controlled size and placement for tailored properties. For example, by selectively placing functional groups in desirable positions on a polymer molecule, polymers that yield pressure sensitive adhesives that exhibit enhanced balance between cohesion and adhesion can be produced. In certain embodiments the polymers also include a third segment which is located between the first reactive segment and the second segment. The third segment may include at least one reactive functionality and/or a non-reactive functionality. Also provided are adhesive compositions based upon the various polymers, and methods of preparing the polymers.

High modulus elastomers and high strength adhesives typically display a constant modulus as a function of temperature. Conversely, highly extensible, tough elastomers, and high tack and peel adhesives often have a degree of viscous liquid character. One route to this behavior is through control of crosslink density via placement of reactive functionalities in specific segments of the polymer. Placing reactive functionalities in segments adjacent to the polymer end groups yields high modulus and high strength upon crosslinking. Placing the reactive functionalities in the central segment(s) of the polymer yields significant viscous liquid character. As described herein, the present subject matter provides strategies for controlling the structure and architecture of polymers and thereby enabling production of compositions having specific and desired characteristics.

Polymers and Crosslinkable Compositions

Generally, the present subject matter provides an acrylic polymer having a first reactive segment that includes at least one monomer having a functional group selected from the group consisting of a UV active functional group, a reactive functional group, a non-reactive functional group, and combinations thereof, and a second segment that includes at least one monomer having a functional group selected from the group consisting of a reactive functional group, a non-reactive functional group, and combinations thereof. The reactive functionalities in the first reactive segment and the second segment may be the same or different from one another. The non-reactive functionalities in the first reactive segment and the second segment may be the same or different from one another. A wide array of reactive functionalities can be included in the first reactive segment and second segment.

The first and second reactive segments are defined by (i) the type of monomers (i.e., UV active, reactive, and non-reactive monomers) present in the particular segment and (ii) the ratio of the non-reactive monomers in each segment. The present subject matter provides an acrylic polymer and/or a pressure sensitive adhesive (PSA) comprising or consisting of, amongst other features, a triblock acrylic copolymer having a {(A)(B)(C)}-{(B)(C)}-{(C)(B)(A)} structure or a {(A)(B)(C)}-{(C)}-{(C)(B)(A)} structure, or a {(A)(C)}-{(C)}-{(C)(A)} structure, where A represents the at least one monomer having a UV functional group, B represents the at least one monomer having a reactive functional group, and C represents the at least one monomer having a non-reactive functional group. And {(A)(B)(C)} and {(A)(C)} represent the first reactive segment(s) while {(B)(C)} and {(C)} represent the second reactive segment(s). That is, the first reactive segment(s) includes a UV active monomer, a reactive monomer, and a non-reactive monomer or the first reactive segment(s) includes a UV active monomer and a non-reactive monomer, while the second reactive segment includes a reactive monomer and a non-reactive monomer or the second reactive segment includes only non-reactive monomers. The at least one monomer having a UV active functional group is about 10% or less, or about 5% or less, or about 4% or less, or about 3% or less by weight of the total polymer weight. The at least one monomer having a reactive functional group in the first reactive segment and the at least one monomer having a reactive functional group in the second reactive segment may be the same type of monomer(s) or different type of monomer(s). The at least one monomer having a non-reactive functional group in the first reactive segment and the at least one monomer having a non-reactive functional group in the second reactive segment may be the same type of monomer(s) or different type of monomer(s). The first reactive segment(s) comprises 40% or less, 30% or less, 20% or less, 10% or less, 5% or less, or 3% or less of the total polymer molecular weight. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second reactive segment.

The present subject matter provides an acrylic polymer and/or a pressure sensitive adhesive (PSA) comprising or consisting of, amongst other features, a diblock acrylic copolymer having a {(A)(B)(C)}-{(B)(C)} structure or a {(A)(C)}-{(C)} structure, where A represents the at least one monomer having a UV functional group, B represents the at least one monomer having a reactive functional group, and C represents the at least one monomer having a non-reactive functional group. And {(A)(B)(C)} and {(A)(C)} represent the first reactive segment(s) while {(B)(C)} and {(C)} represent the second reactive segment(s). That is, the first reactive segment(s) includes a UV active monomer, a reactive monomer, and a non-reactive monomer or the first reactive segment(s) includes a UV active monomer and a non-reactive monomer, while the second reactive segment includes a reactive monomer and a non-reactive monomer or the second reactive segment includes only non-reactive monomers. The at least one monomer having a UV active functional group is about 10% or less, or about 5% or less, or about 4% or less, or about 3% or less by weight of the total polymer weight. The at least one monomer having a reactive functional group in the first reactive segment and the at least one monomer having a reactive functional group in the second reactive segment may be the same type of monomer(s) or different type of monomer(s). The at least one monomer having a non-reactive functional group in the first reactive segment and the at least one monomer having a non-reactive functional group in the second reactive segment may be the same type of monomer(s) or different type of monomer(s). The first reactive segment(s) comprises 40% or less, 30% or less, 20% or less, 10% or less, 5% or less, or 3% or less of the total polymer molecular weight. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more non-reactive monomers. The first reactive segment(s) include about 40% to about 99%, or about 45% to about 99%, or about 50% to about 99%, or about 55% to about 99%, or about 60% to about 99%, or about 65% to about 99%, or about 70% to about 99%, or about 75% to about 99%, or about 80% to about 99%, or about 85% to about 99%, or about 90% to about 99%, or about 95% to about 99% by weight of one or more monomers of the second reactive segment.

As used herein, the term "reactive functional group" refers to a functional group that is capable of reacting with another functional group that is not UV-activatable. Stated differently, as used herein, the term "reactive functional group" refers to a functional group that is crosslinkable but is not UV-activatable. Non-limiting examples of reactive functional groups include hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

In another embodiment of the subject matter, there is provided a crosslinkable composition comprising at least one acrylic copolymer having a first reactive segment of controlled size and position and at least one other or second segment of controlled size and position. The first reactive segment comprises at least one monomer having a functional group selected from the group consisting of a UV active functional group, a reactive functional group, a non-reactive functional group, and combinations thereof. The other or second segment comprises at least one monomer having a functional group selected from the group consisting of a reactive functional group, a non-reactive functional group, and combinations thereof. The functional groups of the first reactive segment and the second segment are capable of undergoing crosslinking reactions. The acrylic copolymer of the crosslinkable composition may in certain embodiments also comprise a third polymeric segment. The third polymeric segment may include a reactive functionality and/or a non-reactive functionality. Additional aspects as described in conjunction with the previously described embodiments of the acrylic copolymers are included in the examples described herein.

In certain embodiments, the acrylic copolymers may include at least one monomer having a non-reactive functional group. The at least one monomer having a non-reactive functional group may be derived from acrylates, methacrylates, or mixtures thereof. The acrylates include $C_1$ to about $C_{20}$ alkyl, aryl or cyclic acrylates such as methyl acrylate, ethyl acrylate, phenyl acrylate, butyl acrylate, 2-ethylhexyl acrylate, n-hexyl acrylate, n-heptyl acrylate, n-octyl acrylate, n-nonyl acrylate, isobornyl acrylate, 2-propyl heptyl acrylate, isodecyl acrylate, isostearyl acrylate and the like. These moieties typically contain from about 3 to about 20 carbon atoms, and in one embodiment about 3 to about 8 carbon atoms. The methacrylates include $C_1$ to about $C_{20}$ alkyl, aryl or cyclic methacrylates such as methyl methacrylate, ethyl methacrylate, butyl methacrylate, 2-ethylhexyl methacrylate, phenyl methacrylate, isobornyl methacrylate, isooctyl methacrylate, and the like. These moieties typically contain from about 4 to about 20 carbon atoms, and in one embodiment about 3 to about 10 carbon atoms.

In certain embodiments, the acrylic polymers contemplated herein exhibit relatively narrow ranges of molecular weight and thus have relatively low polydispersity values. Typically, the polymers exhibit polydispersity (Pdi) values of greater than 1.0, or greater than 1.5, or greater than 2.0, or greater than 2.5, or greater than 3.0, or greater than greater than 3.5, or greater than 4.0. In certain embodiments, the polymers contemplated herein exhibit polydispersity (Pdi) values of less than 4.0, or less than 3.5, or less than 3.0, or less than 2.5, or less than 2.0. In certain embodiments, the polymers exhibit polydispersities of less than 1.5, or as low as about 1.4.

In certain embodiments, the polymers typically have a number average molecular weight (Mn) of from about 5,000 g/mol to about 150,000 g/mol, or from about 10,000 g/mol to about 150,000 g/mol, or from about 40,000 g/mol to about 150,000 g/mol, or from about 50,000 g/mol to about 110,000 g/mol, or from about 30,000 g/mol to about 80,000 g/mol, or from about 10,000 g/mol to about 30,000 g/mol.

In certain embodiments, the polymers typically have a weight average molecular weight (Mw) of from about 50,000 g/mol to about 1,000,000 g/mol, or from about 100,000 g/mol to about 500,000 g/mol, or from about 100,000 g/mol to about 250,000 g/mol. However, it will be appreciated that the subject matter includes polymers having molecular weights and/or polydispersity values greater than or less than the values noted herein.

The average molecular ($M_w$) weight and polydispersity (PDI) were determined by gel permeation chromatography (GPC). The samples were evaluated on a Waters Acquity Advance Polymer Chromatography system. The eluent used was TetraHydroFuran (THF) containing stabilizer. Measurements were carried out at 35° C. Separation was carried out using the columns HSP Gel RT MB-M (1,000 to 4,000,000 Dalton range), HSP Gel HT MB-L/M (500-4,000,000 Dalton range), and HSP Gel HR 1.0 (100-1,000 Dalton range). The sample concentration was 2 g/l, the flow rate of 0.7 ml/min. Measurements were carried out against polystyrene standards.

Reactive Segments

In certain embodiments, the first reactive segment of the acrylic polymer may include a copolymer derived from one or more of the monomers of the second segment and at least one polymerizable comonomer having a crosslinkable functionality, the crosslinkable functionality selected from the group consisting of a UV active functional group, a reactive functional group, and combinations thereof.

In certain embodiments, the first reactive segment of the acrylic polymer may include a copolymer derived from at least one monomer having a non-reactive functional group and at least one polymerizable comonomer having a crosslinkable functionality, the crosslinkable functionality selected from the group consisting of a UV active functional group, a reactive functional group, and combinations thereof.

In certain embodiments, the at least one monomer having a non-reactive functional group may include at least one monomer derived from the formula (I):

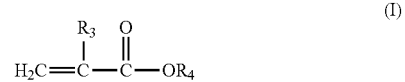

(I)

where $R_3$ is H or $CH_3$ and $R_4$ is a branched or unbranched, saturated alkyl group having 4 to 14 carbon atoms.

In certain embodiments, the at least one monomer having a reactive functional group may include at least one functionalized monomer derived from the formula (I):

(I)

where $R_3$ is H or $CH_3$ and $R_4$ is a branched or unbranched, saturated alkyl group having 4 to 14 carbon atoms. The at least one functionalized monomer of the reactive functional group may include a crosslinkable functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

In certain embodiments, the at least one monomer having a reactive functional group may be derived from the formula (II):

(II)

where R is H or $CH_3$ and X includes a functional group capable of crosslinking. The crosslinkable functional group may include at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

In certain embodiments, the first reactive segment of the acrylic polymer may include a copolymer derived from one or more of the monomers of the second segment and at least one monomer having a reactive functional group. The at least one monomer having a reactive functional group may be derived from the formula (II):

(II)

where R is H or $CH_3$ and X includes a functional group capable of crosslinking. The crosslinkable functional group may include at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

Hydroxy functional monomers include, for example, hydroxy ethyl (meth)acrylate, hydroxy isopropyl (meth)acylate, hydroxy butyl (meth)acrylate and the like.

Epoxy functional monomers include, for example, glycidyl methacrylate and glycidal acrylate. In certain embodiments, a particularly epoxy functional monomer is commercially available under the designation S-100 from Synasia. That monomer is 3, 4 epoxycydohexylmethyl methacrylate, [CAS 82428-30-6], having a chemical formula $C_{11}H_{16}O_3$ and a molecular weight of 196.2.

The acid containing monomers include, for example, unsaturated carboxylic acids containing from 3 to about 20 carbon atoms. The unsaturated carboxylic acids include, among others, acrylic acid, methacrylic acid, itaconic acid, beta carboxy ethyl acrylate, mono-2-acroyloxypropyl succinate, and the like. It is contemplated that phosphoric acids may be used.

Anhydride containing monomers include, for example, maleic anhydride, itaconic anhydride, citraconic anhydride and the like.

The acrylamides include, for example, acrylamide and its derivatives including the N-substituted alkyl and aryl derivatives thereof. These include N-methyl acrylamide, N,N-dimethyl acrylamide, t-octyl acrylamide and the like. The methacrylamides include methacrylamide and its derivatives including the N-substituted alkyl and aryl derivatives thereof.

Vinyl groups include, for example, vinyl esters, vinyl ethers, vinyl amides, and vinyl ketones. The vinyl esters include vinyl acetate, vinyl propionate, vinyl butyrate, vinyl valerate, vinyl versitate, vinyl isobutyrate and the like. The vinyl ethers include vinyl ethers having 1 to about 8 carbon atoms including ethylvinyl ether, butylvinyl ether, 2-ethylhexylvinyl ether and the like. The vinyl amides include vinyl amides having 1 to about 8 carbon atoms including vinyl pyrrolidone, and the like. The vinyl ketones include vinyl ketones having 1 to about 8 carbon atoms including ethylvinyl ketone, butylvinyl ketone, and the like.

In another embodiment, the first reactive segment of the acrylic polymer may include a copolymer derived from one or more of the monomers of the second segment and at least one polymerizable comonomer having a crosslinkable functionality, the crosslinkable functionality selected from the group consisting of a UV active functional group, a reactive functional group, and combinations thereof. The at least one polymerizable comonomer having a reactive functional group includes at least one functionalized monomer derived from the formula (I):

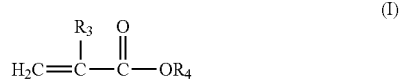
(I)

where $R_3$ is H or $CH_3$ and $R_4$ is a branched or unbranched, saturated alkyl group having 4 to 14 carbon atoms. The at least one functionalized monomer may include a crosslinkable functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

In particular embodiments, the at least one polymerizable comonomer having a crosslinkable functionality includes a UV active functional group. Although a wide array of UV active functional groups can potentially be used, in certain embodiments the UV active functional group is selected from benzophenones, double bonds, and combinations thereof.

In many embodiments, the UV active functional group is represented by Formula (III) as follows:

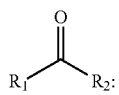

(III)

in which $R_1$ and $R_2$ is each independently an organic radical selected from the group of methyl, aryl, and alkyl. In many embodiments, $R_1$ and/or $R_2$ is an aromatic or substituted aromatic group. In certain embodiments, $R_1$ and/or $R_2$ is a phenyl or substituted phenyl group. In particular embodiments, the UV active functional group includes acetophenone, an acetophenone derivative, benzophenone, a benzophenone derivative, anthraquinone, an anthraquinone derivative, benzile, a benzile derivative, thioxanthone, a thioxanthone derivative, xanthone, a xanthone derivative, a benzoin ether, a benzoin ether derivative, an alpha-ketol, an alpha-ketol derivative, and combinations thereof.

In many embodiments, the UV active functional group is a UV-activatable group, i.e., decomposes or is otherwise triggered to form reactive species that activate crosslinking of polymers.

It is also contemplated that the UV active functional group could include or be based upon aromatic sulfonyl chlorides, photoactive oximes, and azo-type initiators.

Furthermore, in many embodiments the UV active functional group can be one or more benzophenone, benzophenone derivatives, double bonds, and/or combinations of these with other UV active functional groups. It will be understood that the present subject matter is not limited to any of these noted UV active functional groups.

In still additional embodiments, the UV active functional group includes one or more photoinitiators.

Additionally, the present subject matter may include the use of one or more other UV active functional groups instead of, or in combination with the UV active functional groups described herein.

In certain embodiments, the UV active functional groups are incorporated along end segment(s) of the polymer. In particular embodiments, the UV active functional group(s) are entirely incorporated along an end segment or end segments with the reactive functional group(s) and/or the non-reactive functional group(s) randomly incorporated within the same end segment(s) that comprise 40% or less of the total polymer molecular weight, such that the remaining 60% or more of the polymer or polymer interior segment(s) is free of UV functional groups and includes reactive functional group(s) and/or non-reactive functional group(s) randomly incorporated therein.

In other particular embodiments, the UV active functional group(s) are entirely incorporated along an end segment or end segments with the reactive functional group(s) and/or the non-reactive functional group(s) randomly incorporated within the same end segment(s) that comprise 30% or less of the total polymer molecular weight, such that the remaining 70% or more of the polymer or polymer interior segment(s) is free of UV functional groups and includes reactive functional group(s) and/or non-reactive functional group(s) randomly incorporated therein.

In still other particular embodiments, the UV active functional groups are entirely incorporated along an end segment or end segments with the reactive functional group(s) and/or the non-reactive functional group(s) randomly incorporated within the same end segment(s) that comprise 20% or less of the total polymer molecular weight, such that the remaining 80% or more of the polymer or polymer interior segment(s) is free of UV functional groups and includes reactive functional group(s) and/or non-reactive functional group(s) randomly incorporated therein.

And, in still other particular embodiments, the UV active functional group(s) are entirely incorporated along an end segment or end segments with the reactive functional group(s) and/or the non-reactive functional group(s) randomly incorporated within the same end segment(s) that comprise 10% or less of the total polymer molecular weight, such that the remaining 90% or more of the polymer or polymer interior segment(s) is free of UV functional groups and includes reactive functional group(s) and/or non-reactive functional group(s) randomly incorporated therein.

In yet another particular embodiment, the UV active functional groups are entirely incorporated along an end segment or end segments with the reactive functional group(s) and/or the non-reactive functional group(s) randomly incorporated within the same end segment(s) that comprise 5% or less of the total polymer molecular weight, such that the remaining 95% or more of the polymer or polymer interior segment(s) is free of UV functional groups and includes reactive functional group(s) and/or non-reactive functional group(s) randomly incorporated therein.

And, in still another more particular embodiment, the UV active functional groups are entirely incorporated along an end segment or end segments with the reactive functional group(s) and/or the non-reactive functional group(s) randomly incorporated within the same end segment(s) that comprise 3% or less of the total polymer molecular weight, such that the remaining 97% or more of the polymer or polymer interior segment(s) is free of UV functional groups and includes reactive functional group(s) and/or non-reactive functional group(s) randomly incorporated therein.

Methods

The present subject matter also provides, in another embodiment, a multiple step polymerization process for making a crosslinkable acrylic copolymer having a first reactive segment with polymerization process for making a crosslinkable acrylic copolymer having a first reactive segment having one or more functional groups selected from the group consisting of a UV active functional group, a reactive functional group, a non-reactive functional group, and combinations thereof provided by at least one monomer. Preferably, the monomer is an acrylic monomer. A second segment is added to the first segment to form the acrylic copolymer. The second segment may contain one or more functional groups selected from the group consisting of a reactive functional group, a non-reactive functional group, and combinations thereof and is miscible with the first reactive segment.

As used herein, the term "molecularly miscible" means a compound or mixture of compounds that exhibit properties in the bulk state that can be observed and/or measured by one of ordinary skill in the art and are indicative of single phase behavior or a single phase polymer. The term "single phase behavior" refers to behavior or physical properties that are uniform or substantially so. With respect to the acrylic copolymer, the observation of a single Tg is indicative of polymer segment miscibility. The single Tg is intermediate between those of the constituent polymer segments and varies monotonically between these values as the relative amounts of each segment changes. In contrast to single phase behavior evidenced by a molecularly miscible compound or mixture of compounds, at a given temperature, a phase separated compound demonstrates multiple, independent sets of properties that are attributable to the different phases of matter present therein. Such sets of properties include, without limitation, Tg, solubility parameters, refractive index, and physical state/phase of matter. Accordingly, the term "phase separated" is defined as two or more substances which are molecularly segregated due to one or more chemical and/or physical properties dependent upon, without limitation, polarity, molecular weight, relative amounts of the polymer segments, and Tg (phase of matter).

Evidence of immiscibility/incompatibility between blocks/segments of a block copolymer, such as an ABA block copolymer, can be confirmed via rheological measurements such as Dynamic Mechanical Analysis (DMA) or Differential Scanning calorimetry (DSC) and the microstructure determined from microscopy. Miscible polymers exhibit no heterogeneity (i.e., are single phase polymers) in their microstructure. The degree of miscibility/compatibility of a polymer blend can be simply determined by measuring the glass transition temperature(s) in a DMA or DSC can. The presence of two Tgs indicates immiscibility, while the presence of only a single Tg indicates a miscible blend. For block copolymers with mutually incompatible blocks, the microdomains formed by the different blocks exhibit separate/different Tgs, and for incompatible block copolymers separate Tg values are also observed in the DMA and/or DSC plots. For example, for typical styrenic and acrylic ABA block copolymers, the hard A block and the soft B block have sufficiently different solubility parameters such that they are not thermodynamically compatible with each other. As a result, block copolymer-based adhesives have a unique microphase-separated morphology, where A blocks form a hard phase embedded in a soft, continuous phase composed of B blocks. That is, a result of the frequent immiscibility/incompatibility of the two types of blocks present in ABA block copolymers, block copolymers generally exhibit two distinct glass transitions (a DMA bimodal tan 5 curve) at temperatures very close to those of the corresponding homopolymers. The presence of acid, however, in block copolymers such as P(MMA/MAA)-PBA-P (MMA/MAA) raises the Tg of the end block and also enhances the phase separation between the soft acrylate and the hard PMMA domains. Therefore, block copolymers can exhibit morphologies which range from two-phase segregated materials to single-phase homogeneous materials.

Figure 13:
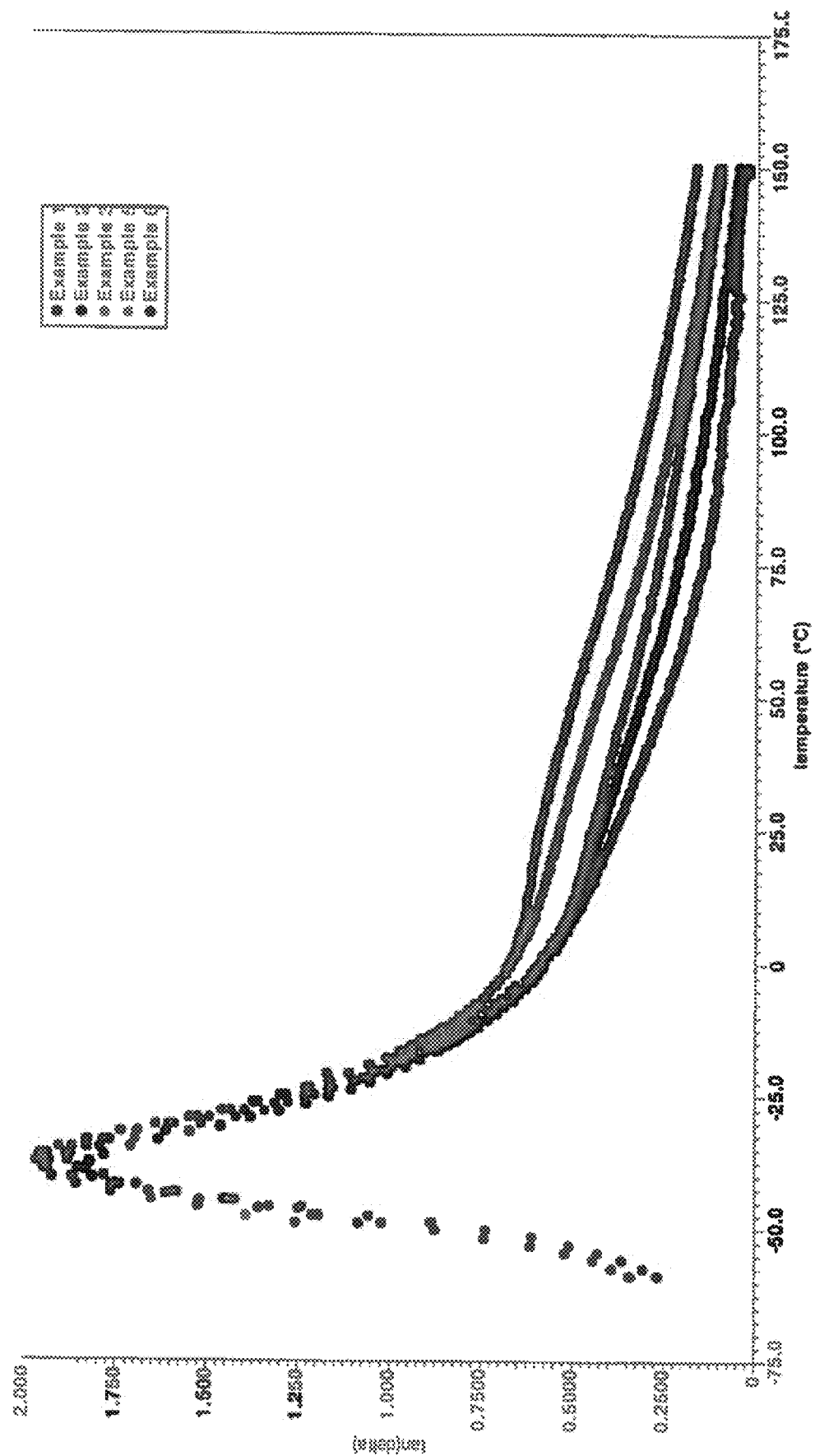
FIG. 13 is a plot of tan (delta) versus temperature for samples of Examples 1-3, 5, and 6 described herein.

The acrylic polymers contemplated herein are architectured polymers formed via a controlled free-radical process including selecting monomers that form homogeneous (single phase) acrylic block copolymers as evidenced by the presence of a single Tg peak shown in FIG. 13, indicative of a homogeneous (single phase) polymer prior to crosslinking.

As used herein, the term "homogeneous polymer" is a block copolymer having substantially one morphological phase in the same state. For example, a block copolymer of two or more segments where one segment is miscible with another segment is said to be homogeneous in the liquid state. Such morphology is determined using atomic force microscopy (AFM) or scanning electron microscopy (SEM). By miscible is meant that the block copolymer of two or more segments exhibits single-phase behavior for the glass transition temperature, e.g. the Tg would exist as a single, sharp transition temperature on a dynamic mechanical thermal analyzer (DMTA) trace of tan 5 (the ratio of loss modulus to the storage modulus) versus temperature, as shown in the plots of FIG. 13. By contrast, two separate transition temperatures would be observed for an immiscible block copolymer, typically corresponding to the temperatures for each of the individual segments of the block copolymer. Thus a block copolymer is miscible when there is one Tg indicated on the DMTA trace. A miscible block copolymer is homogeneous, while an immiscible block copolymer is heterogeneous.

In contrast, the term "heterogeneous polymer" means a block copolymer having two or more morphological phases in the same or different state. For example, a block copolymer of two segments where one segment forms discrete packets dispersed in a matrix of another segment is said to be heterogeneous. Also a heterogeneous polymer is defined to include co-continuous segments where the block copolymer components are separately visible, but it is unclear which is the continuous phase and which is the discontinuous phase. Such morphology is determined using scanning electron microscopy (SEM) or atomic force microscopy (AFM). By continuous phase is meant the matrix phase in a heterogeneous block copolymer. By discontinuous phase is meant the dispersed phase in a heterogeneous block copolymer.

DMA was performed on a TA Instruments AR2000 rheometer fitted with parallel plate clamps. 1.0 mm thick samples were placed in the clamp and annealed at 70° C. for 10 minutes to ensure good adhesion. The samples were then cooled to −60° C. to begin a temp sweep to 150° C. at a ramp rate of 3° C./min. During the temp ramp, the samples were oscillated at a frequency of 10 rad/sec.

Representative and non-limiting examples of ranges of glass transition temperatures (Tg) for the acrylic polymers and/or pressure sensitive adhesives of the present subject matter are from about 15° C. to about −115° C., or from about 0° C. to about −80° C., and/or from about −35° C. to about −60° C.

Controlled Radical Polymerization

With conventional free-radical polymerization, polymers are terminated when the reactive free radical end group is destroyed via termination or chain transfer reactions. The termination and chain transfer processes are typically irreversible and yield a polymer that is inactive. The result of this is a broad molecular weight distribution and little control over the distribution of monomers in the polymer backbone. "Living" polymerization enables control over the polymer architecture, which includes molecular weight, molecular weight distribution (polydispersity), functionality, and composition. In living polymerization strategies, the occurrence of premature termination is minimized, and molecular weight proceeds linearly with time until all monomer is consumed or intentionally terminated. Controlled radical polymerizations involve reversible radical processes in which irreversible termination and chain transfer are largely absent. Controlled free radical polymerization includes three fundamental techniques, atom transfer radical polymerization (ATRP), reversible addition-fragmentation chain transfer (RAFT), and stable free radical polymerization (SFRP) (of which nitroxide mediated polymerization (NMP) is a subset). RAFT and SFRP are particularly useful methods because of their tolerance to a wide array of functional groups and their efficiency and versatility in producing controlled radical polymerized polymers.

The acrylic copolymers of the subject matter are prepared using any of the controlled radical polymerization processes, which include atom-transfer radical polymerization (ATRP); rapid addition-fragmentation chain transfer (RAFT); and stable free radical polymerization (SFRP). Nitroxide-mediated polymerization (NMP) is an example of an SFRP process.

ATRP involves the chain initiation of free radical polymerization by a halogenated organic species in the presence of a metal halide species. The metal has a number of different oxidation states that allows it to abstract a halide from the organohalide, creating a radical that then starts free radical polymerization. After initiation and propagation, the radical on the chain active chain terminus is reversibly terminated (with the halide) by reacting with the catalyst in its higher oxidation state. A simplified mechanism for reversible activation-deactivation of polymer chains during ATRP is shown in Scheme 1. Thus the redox process gives rise to an equilibrium between dormant (polymer-halide) and active (polymer-radical) chains. The equilibrium is designed to heavily favor the dormant state, which effectively reduces the radical concentration to sufficiently low levels to limit bimolecular coupling.

The initiator in ATRP is usually a low molecular weight activated organic halide (RX, R=activated alkyl, X=chlorine, bromine, iodine). However, organic pseudohalides (e.g., X=thiocyanate, azide) and compounds with weak N—X (e.g., N-bromosuccinimide) or S—X (e.g., sulfonyl halides) may be used. ATRP can be mediated by a variety of metals, including Ti, Mo, Re, Fe, Ru, Os, Rh, Co, Ni, Pd and Cu. Complexes of Cu offer the most efficient catalysts in the ATRP of a broad range of monomer in diverse media.

becomes part of the dormant polymer chain. The key mechanistic features of RAFT are illustrated in Scheme 2. Common RAFT agents contain thiocarbonyl-thio groups, and include, for example, dithioesters, dithiocarbamates, trithiocarbonates and xanthenes. Examples of useful RAFT agents include those described in "The Chemistry of Radical Polymerization", Graeme Moad & David H. Solomon, 2$^{nd}$ rev. ed., 2006, Elsevier, p. 508-514, which is incorporated by reference herein.

Initiation and radical-radical termination occur as in conventional radical polymerization. In the early stages of the polymerization, addition of a propagating radical (Pn·) to the thiocarbonylthio compound followed by fragmentation of the intermediate radical gives rise to a polymeric thiocarbonylthio compound and a new radical (R·). Reaction of the radical (R·) with monomer forms a new propagating radical (Pm·). A rapid equilibrium between the active propagating radicals (Pn· and Pm·) and the dormant polymeric thiocarbonylthio compounds provides equal probability for all chains to grow and allows for the production of narrow dispersity polymers.

Scheme 2

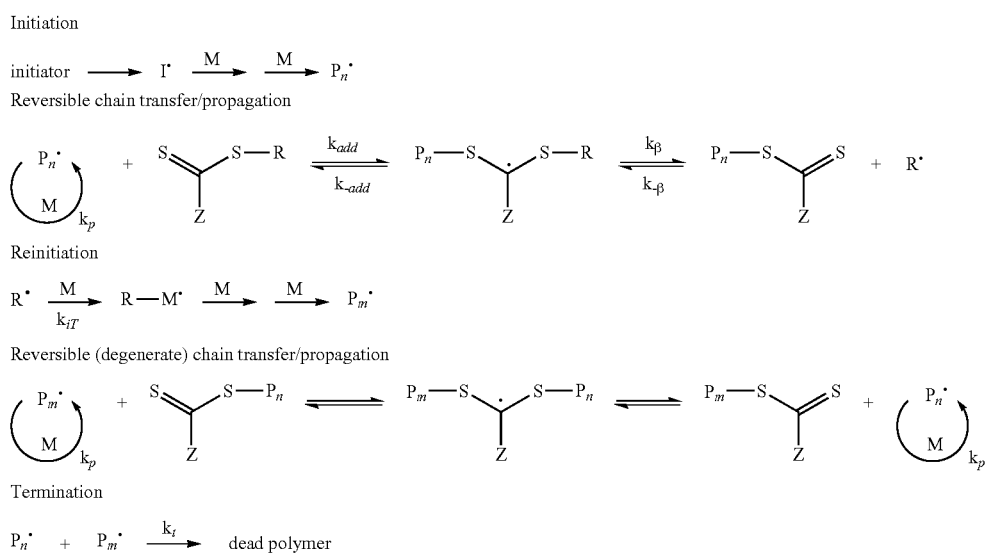

Commonly used nitrogen-based ligands used in conjunction with Cu ATRP catalysts include derivatives of bidentate bipyridine and pyridine imine, tridentate diethylenetriamine and tetradentate tris[2-aminoethylene]amine and tetraazacyclotetradecane.

Scheme 1

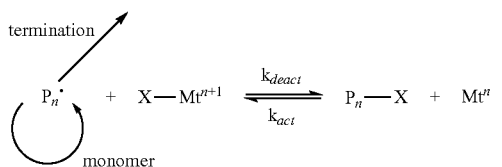

Controlled polymerization by RAFT occurs via rapid chain transfer between growing polymer radicals and dormant polymer chains. After initiation, the control agent SFRP, and in particular, NMP achieves control with dynamic equilibrium between dormant alkoxyamines and actively propagating radicals. The use of nitroxides to mediate (i.e., control) free radical polymerization has been developed extensively. Many different types of nitroxides have been described and there are many methods for producing nitroxides in-situ. Regardless of the nitroxide or its method of generation, the key mechanistic feature of NMP is reversible coupling of the nitroxide (i.e., R2NO) to a growing polymer chain radical (P·) as shown in Scheme 3.

Scheme 3

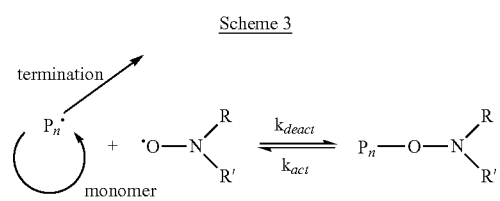

Examples of useful NMP agents include those described in "The Chemistry of Radical Polymerization", Graeme Moad & David H. Solomon, 2$^{nd}$ rev. ed., 2006, Elsevier, p. 473-475, which is incorporated by reference herein. An example of a commercially available NMP agent is BlocBuilder®, an alkoxyamine compound that acts an initiator and control agent, available from Arkema.

The methods for forming the acrylic polymers contemplated herein may use one or more polymerization catalysts. The polymerization catalyst can be, for example, organic tin compounds, metal complexes, amine compounds and other basic compounds, organic phosphate compounds, and organic acids. Examples of the organic tin compounds include dibutyltin dilaurate, dibutyltin maleate, dibutyltin phthalate, stannous octoate, dibutyltin methoxide, dibutyltin diacetylacetate and dibutyltin diversatate. Examples of metal complexes are titanate compounds such as tetrabutyl titanate, tetraisopropyl titanate, and tetraethanolamine titanate; metal salts of carboxylic acids, such as lead octoate, lead naphthoate, and cobalt naphthoate; and metal acetylacetonate complexes such as aluminum acetylacetonate complex and vanadium acetylacetonate complex. The amine compounds and other basic compounds include, for example aminisilanes such as γ-aminopropyl trimethoxysilane and γ-aminopropyltriethoxysilane; quaternary ammonium salts such as tetramethylammonium chloride and benzalkonium chloride; and straight-chain or cyclic tertiary amines or quaternary ammonium salts each containing plural nitrogen atoms. The organic phosphate compounds include monomethyl phosphate, di-n-butyl phosphate and triphenyl phosphate. Examples of organic acid catalysts include alkyl sulfonic acids such as methane sulfonic acid, aryl sulfonic acids such as p-toluene sulfonic acid, benzene sulfonic acid, styrene sulfonic acid and the like.

Adhesives

Adhesives having a wide array of properties can be formed from the acrylic polymers and/or compositions described herein. Generally, the acrylic polymers described herein are crosslinked and optionally combined with one or more components to provide an adhesive composition. In certain embodiments, the adhesives are pressure sensitive adhesives. The polymer may be crosslinked during post curing of the adhesive to increase the cohesive strength of the pressure sensitive adhesive. This can be achieved via covalent crosslinking such as heat, actinic or electron beam radiation, or metal based ionic crosslinking between functional groups. Table 1 below lists representative examples of crosslinkers for various functional groups of the segmented polymer.

TABLE 1

| Crosslinkers | |
|---|---|
| Functional Group of Segmented Polymer | Crosslinker |
| Hydroxyl | Isocyanate, Melamine Formaldehyde, Anhydride, Epoxy, Titanium esters and Chelates |
| Carboxylic acid, phosphoric acid | Aziridines, Isocyanate, Melamine Formaldehyde, Anhydride, Epoxy, Carboiimides, Metal Chelates, Titanium esters and Oxazolines |
| Isocyanate | Self-reactive, Carboxylic acid, Amine, Hydroxyl |
| Vinyl | Addition reaction with Silicone hydride |
| (Meth)acrylate | Amine, Mercaptan, Self-reactive with radical catalyst (UV, Thermal), Acetoacetate |
| Epoxy | Amine, Carboxylic acid, Phosphoric acid, Hydroxyl, Mercaptan |

TABLE 1-continued

| Crosslinkers | |
|---|---|
| Functional Group of Segmented Polymer | Crosslinker |
| Amine | Isocyanate, Melamine formaldehyde, anhydride, epoxy, acetoacetate |
| Mercapto (thiol) | Isocyanate, Melamine formaldehyde, Anhydride, Epoxy |
| Acetoacetate | Acrylate, Amine |
| Alkoxymethylol | Acid, Hydroxyl, Thiol (Mercapto), Amine |
| Cylic Ethers | Hydroxyl, Amines, Thiol (Mercapto) |

Suitable polyfunctional aziridines include, for example, trimethylolpropane tris[3-aziridinylpropionate]; trimethylolpropane tris[3-(2-methylaziridinyl) propionate]; trimethylolpropane tris[2-aziridinylbutyrate]; tris(1-aziridinyl)-phosphine oxide; tris(2-methyl-1-aziridinyl)phosphine oxide; penta-erythritoltris[3-(1-aziridinyl)propionate]; and pentaerythritol tetrakis[3-(1-aziridinyl)propionate]. Combinations of more than one polyfunctional aziridine may also be used. Examples of commercially available polyfunctional aziridines include NEOCRYL CX-100 from Zeneca Resins, believed to be trimethylolpropaten tris[3-(2-methylaziridinyl)-propanoate], and Xama-2, Xama-7 and Xama-220 from Bayer Material Science.

Multifunctional aziridine amides which have the general formula (IV):

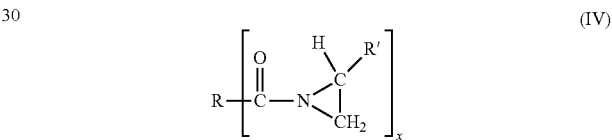

(IV)

wherein R can be either an alkylene or aromatic group and R' can be a hydrogen or alkyl group and x is at least 2 may be used. Examples of suitable multifunctional aziridine amides include 1,1'-(1,3-phenylenedicarbonyl)bis[2-methyl aziridine]; 2,2,4-trimethyladipoyl bis [2-ethyl aziridine]; 1,1'-azelaoyl bis [2-methyl aziridine]; and 2,4,6-tris(2-ethyl-1-aziridinyl)-1,3,5 triazine.

Metal chelate crosslinking agents may be compounds prepared by coordinating multivalent metals such as Al, Fe, Zn, Sn, Ti, Sb, Mg and V with acethylacetone or ethyl acetoacetonate.

Among the isocyanate crosslinking agents that can be used are aromatic, aliphatic and cycloaliphatic diisocyanates and triisocyanates. Examples include 2,4-toluene diisocyanate, m-phenylene diisocyanate, 4-chloro-1,3-phenylene diisocyanate, 3,3'-dimethyl-4,4'-diphenylene diisocyanate, 4,4'-diphenylene diisocyanate, xylene diisocyanate, 1,6-hexamethylene diisocyanate, 1,10-decamethylene diisocyanate, 1,4-cyclohexylene diisocyanate, 4,4'methylene bis(cyclohexyl isocyanate), 1,5-tetrahydronaphthalene diisocyanate, paraxylylene diisocyanate, durene diisocyante, 1,2,4-benzene diisocyanate, isoform diisocyanate, 1,4-tetramethylxylene diisocyanate, 1,5-naphthalene diisocyanate, or their reactants with polyol such as trimethylolpropane.

Other useful crosslinking agents include monomeric and polymeric melamine crosslinkers, such as Cymel 303 and 370 available from Cytec.

The crosslinking agent is typically used at a level from about 0.05% to about 5%, or from about 0.075% to about 2%, or from about 0.1% to about 1.5% by weight of adhesive solids.

Anhydride functional segmented polymers may be converted to silanes via a post polymerization reaction with amino-, mercapto- or hydroxyl-functional silanes. Examples of amino group-containing alkoxysilanes having a primary amino group alone as a reactive group include aminoalkyltrialkoxysilanes such as aminomethyltrimethoxysilane, aminomethyltriethoxysilane, β-amino-ethyltrimethoxysilane, β-aminoethyltriethoxysilane, γ-aminopropyltrimethoxysilane, γ-aminopropyltriethoxysilane, γ-aminopropyltripropoxysilane, γ-aminopropyltriisopropoxysilane, and γ-aminopropyltributoxysilane; (aminoalkyl)-alkyldialkoxysilanes such as β-aminoethylmethyldimethoxysilane, γ-amino-ethylmethyldiethoxysilane, γ-aminopropylmethyldimethoxysilane, γ-aminopropyl-methyldiethoxysilane, and γ-aminopropylmethyldipropoxysilane; and corresponding aminoalkyldialkyl(mono)alkoxysilanes.

Examples of amino group-containing alkoxysilanes having a primary amino group and a secondary amino group as reactive groups include N-(aminoalkyl)aminoalkyltrialkoxysilanes such as N-β-(aminoethyl)-γ-aminopropyltrimethoxysilane and N-β-(aminoethyl)-γ-aminopropyltriethoxysilane; and N-(aminoalkyl)aminoalkylalkyldialkoxysilanes such as N-β-(aminoethyl)-γ-amino-propylmethyldimethoxysilane and N-β-(aminoethyl)-γ-aminopropylmethyl-diethoxysilane.

Examples of amino group-containing alkoxysilanes having a secondary amino group alone as a reactive group include N-phenylamino-methyltrimethoxysilane and N-phenyl-β-aminoethyltrialkoxysilanes such as N-phenyl-β-aminoethyltrimethoxysilane and N-phenyl-β-aminoethyltriethoxysilane; N-phenyl-γ-aminopropyltrialkoxysilanes such as N-phenyl-γ-aminopropyltrimethoxysilane, N-phenyl-γ-aminopropyltriethoxysilane, N-phenyl-γ-aminopropyltripropoxysilane, and N-phenyl-γ-aminopropyltributoxysilane; corresponding N-phenylaminoalkyl(mono- or di-)alkyl (di- or mono-)alkoxysilanes; as well as N-alkylaminoalkyltrialkoxysilanes corresponding to the above-listed amino group-containing alkoxysilanes having a secondary amino group substituted with phenyl group, such as N-methyl-3-aminopropyltrimethoxysilane, N-ethyl-3-aminopropyltrimethoxysilane, N-n-propyl-3-aminopropyltrimethoxysilane, N-n-butyl-aminomethyltrimethoxysilane, N-n-butyl-2-aminoethyltrimethoxysilane, N-n-butyl-3-aminopropyltrimethoxysilane, N-n-butyl-3-aminopropyltriethoxysilane, and N-n-butyl-3-aminopropyltripropoxysilane, and corresponding N-alkylaminoalkyl(mono- or di-)alkyl(di- or mono)alkoxysilanes. Others include N-cyclohexylaminomethylmethyldiethoxy silane and N-cyclohexylaminomethyl-triethoxysilane.

Examples of the mercapto group-containing silanes include mercaptoalkyltrialkoxysilanes such as mercaptomethyltrimethoxysilane, mercaptomethyltriethoxysilane, β-mercaptoethyltrimethoxysilane, β-mercapto-ethyltriethoxysilane, β-mercaptoethyltripropoxysilane, β-mercaptoethyl-triisopropoxysilane, β-mercaptoethyltributoxysilane, γ-mercaptopropyl-trimethoxysilane, γ-mercaptopropyltriethoxysilane, γ-mercaptopropyltripropoxysilane, γ-mercaptopropyltriisopropoxysilane, and γ-mercapto-propyltributoxysilane; (mercaptoalkyl)alkyldialkoxysilanes such as β-mercaptoethylmethyldimethoxysilane, β-mercaptoethylmethyldiethoxysilane, γ-mercaptopropylmethyldimethoxysilane, γ-mercaptopropylmethyldiethoxysilane, γ-mercaptopropylmethyldiisopropoxysilane, β-mercaptopropylmethyldiisopropoxy-silane, γ-mercaptopropylmethyldibutoxysilane, β-mercaptopropylmethyldibutoxysilane, γ-mercaptopropylethyldimethoxy-silane, γ-mercaptopropylethyldiethoxysilane, γ-mercaptopropylethyldipropoxy-silane, γ-mercaptopropylethyldiisopropoxysilane, and γ-mercaptopropylethyldibutoxysilane; and corresponding (mercaptoalkyl)dialkyl(mono)-alkoxysilanes.

Examples of hydroxyl-functional silanes include hydroxymethyltrialkoxy silanes having the formula (V):

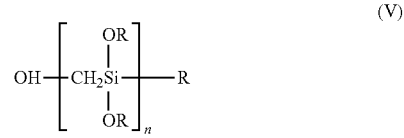

Where R is an alkyl group and n is at least 1. The alkyl group may be a lower alkyl group having 1 to 6 carbon atoms, or 1 to 3 carbon atoms. Particularly useful are the silanes in which the alkyl group is methyl or ethyl, namely hydroxymethyltriethoxysilane and hydroxymethyltriethoxysilane when n is equal to 1.

The adhesives of the present subject matter may further comprise additives such as pigments, fillers, plasticizer, diluents, antioxidants, tackifiers and the like. Pigment, if desired, is provided in an amount sufficient to impart the desired color to the adhesive. Examples of pigments include, without limitation, solid inorganic fillers such as carbon black, titanium dioxide and the like, and organic dyes. Additional inorganic fillers such as aluminum trihydrate, christobalite, glass fibers, kaolin, precipitated or fumed silica, copper, quartz, wollasonite, mica, magnesium hydroxide, silicates (e.g. feldspar), talc, nickel and calcium carbonate are also useful. Metal oxides such as aluminum trihydrate and magnesium hydroxide are particularly useful as flame retardants.

A wide variety of tackifiers can be used to enhance the tack and peel of the adhesive. These include rosins and rosin derivatives including rosinous materials that occur naturally in the oleoresin of pine trees, as well as derivatives thereof including rosin esters, modified rosins such as fractionated, hydrogenated, dehydrogenated, and polymerized rosins, modified rosin esters and the like.

There may also be employed terpene resins which are hydrocarbons of the formula $C_{10}H_{16}$, occurring in most essential oils and oleoresins of plants, and phenol modified terpene resins like alpha pinene, beta pinene, dipentene, limonene, myrecene, bornylene, camphene, and the like. Various aliphatic hydrocarbon resins like Escorez 1304, manufactured by Exxon Chemical Co., and aromatic hydrocarbon resins based on $C_9$, $C_5$, dicyclopentadiene, coumarone, indene, styrene, substituted styrenes and styrene derivatives and the like can also be used.

Hydrogenated and partially hydrogenated resins such as Regalrez 1018, Regalrez 1033, Regalrez 1078, Regalrez 1094, Regalrez 1126, Regalrez 3102, Regalrez 6108, etc., produced by Eastman Chemical Company, can be used. Various terpene phenolic resins of the type SP 560 and SP 553, manufactured and sold by Schenectady Chemical Inc., Nirez 1100, manufactured and sold by Reichold Chemical Inc., and Piccolyte S-100, manufactured and sold by Hercules Corporation, are particularly useful tackifiers for the present subject matter. Various mixed aliphatic and aromatic resins, such as Hercotex AD 1100, manufactured and sold by Hercules Corporation, can be used.

While the resins described above are quite useful for tackifying the copolymers of the instant subject matter, the particular tackifying resin and/or amount selected for a given formulation may depend upon the type of acrylic polymer being tackified. Many resins which are known in the prior art as being useful for tackifying acrylic based pressure sensitive adhesives can be effectively used in the practice of the present subject matter, although the scope of the subject matter is not limited to only such resins. Resins described in Satas, Handbook of Pressure Sensitive Adhesive Technology, Von Nostrand Reinhold, Co, Chap. 20, pages 527-584 (1989) (incorporated by reference herein) could be used.

The amount of tackifier used in the present subject matter is dependent upon the type of copolymer and tackifier used. Typically, pressure sensitive adhesive compositions prepared in accordance with the present subject matter will comprise from 5 to about 60% by weight total of one or more tackifiers.

In one embodiment, the tackifier has a ring and ball softening point of from about 100° C. to about 150° C. In one embodiment, the tackifier comprises a terpene phenolic tackifier having a ring and ball softening point of from about 110° C. to about 120° C.

In another embodiment, the added resin may serve a dual purpose. For example, a resin such as Wingstay L®, a butylated reaction product of para-cresol and dicyclopentadiene with an average molecular weight of 650 produced by Eliokem, can serve both as a tackifier and an antioxidant.

In one embodiment, a low molecular weight polymeric additive is incorporated into the adhesive composition. The polymeric additive is polymerized from monomers selected from $C_1$-$C_{20}$ alkyl and cycloalkyl acrylates, $C_1$-$C_{20}$ alkyl and cycloalkyl methacrylates, free radical polymerizable olefinic acids, and optionally other ethylenically unsaturated monomers. Suitable alkyl and cycloalkyl acrylates include the various esters of acrylic acid such as methyl acrylate, ethyl acrylate, n-propyl acrylate, isopropyl acrylate, n-butyl acrylate, isobutyl acrylate, t-butyl acrylate, isobornyl acrylate, pentyl acrylate, hexyl acrylate, octyl acrylate, iso-octyl acrylate, nonyl acrylate, lauryl acrylate, stearyl acrylate, eicosyl acrylate, 2-ethylhexyl acrylate, cyclohexyl acrylate, cycloheptyl acrylate, and the like and mixtures thereof. Suitable alkyl and cycloalkyl methacrylate include the esters of methacrylic acid such as methyl methacrylate, ethyl methacrylate, propyl methacrylate, n-butyl methacrylate, t-butyl methacrylate, isobutyl methacrylate, pentyl methacrylate, hexyl methacrylate, cyclohexyl methacrylate, 2-ethylhexyl methacrylate, isobornyl methacrylate, heptyl methacrylate, cycloheptyl methacrylate, octyl methacrylate, iso-octyl methacrylate, nonyl methacrylate, decyl methacrylate, lauryl methacrylate, eicosyl methacrylate and the like and mixtures thereof. Suitable free-radical polymerizable olefinic acids include acrylic acid, methacrylic acid, fumaric acid, crotonic acid, itaconic acid, 2-acryloxypropionic acid, and the like and mixtures thereof.

Various amounts of other ethylenically-unsaturated monomers can optionally be used provided that the polymeric additive has a softening point greater than about 40° C. and a number average molecular weight less than about 35,000. Optional ethylenically-unsaturated monomers suitable for use in the polymeric additive include, for example, styrene, alpha-methyl styrene, vinyl toluene, acrylonitrile, methacrylonitrile, ethylene, vinyl acetate, vinyl chloride, vinylidene chloride, acrylamide, methacrylamide 2-cyanoethyl acrylate, 2-cyanoethyl methacrylate, dimethylaminoethyl methacrylate, dimethylaminopropyl methacrylate t-butylaminoethyl methacrylate, glycidyl acrylate, glycidyl methacrylate, benzyl acrylate, benzyl methacrylate, phenyl acrylate, phenyl methacrylate and the like. The amount of the polymeric additive used may be in the range of about 1% to about 55% by weight, based on the total weight of the adhesive composition. Such low molecular weight additives as described in U.S. Pat. No. 4,912,169, the disclosure of which is hereby incorporated by reference.

In certain embodiments, the adhesives have a relatively high solids content. Typically, the weight percentage of solids is greater than 50%, or at least 60%, or at least 70%.

In certain embodiments, the present subject matter adhesives or compositions are polymerized and/or crosslinked by exposure to actinic radiation, and particularly ultraviolet (UV) radiation or near UV radiation. Electron beam radiation can also be used. As will be appreciated, sufficient exposure to such radiation causes polymerization and/or crosslinking involving various functional groups incorporated in the polymers.

Use of the aspects described herein enable formulation of a pre-adhesive formulation that can be further processed by subsequent or additional exposure to actinic radiation and particularly UV radiation. Thus, an initial batch or a desired amount of pre-adhesive can be polymerized or at least partially polymerized in bulk and then stored or held for later application or coating to a substrate of interest.

After the adhesive is coated on a substrate at a desired coat weight, the coated substrate is irradiated with actinic radiation and particularly UV radiation to yield a crosslinked adhesive and in many embodiments a pressure sensitive adhesive having high cohesive strength at room and elevated temperatures. A variety of UV light sources are known, including low, high, and medium pressure mercury lamps, which emit over a wide range of wavelengths. Most pigmented and unpigmented adhesives can be readily cured using a medium pressure mercury lamp, which has emission bands ranging from about 240 to about 410 nanometers. Alternatively, UV sources that emit over a more narrow range of wavelengths can be used if desired, so long as the emission spectrum of the source overlaps with the absorption spectrum of the initiator(s) employed within the adhesive. Where the adhesive is pigmented with titanium dioxide or similar pigments, the preferred initiator has absorption bands in the near UV region, and a UV source that emits at least in that region is employed.

FIG. 1 is a process schematic diagram depicting a representative process and system 10 for producing an adhesive and polymerizing and crosslinking the adhesive in accordance with the present subject matter. The system 10 generally comprises a dispenser or heater 12 for introducing one or more adhesives, polymers, and/or monomers via feed line 14 to a blender or mixer 22. Also provided are additional feed lines 16, 18, and 20 which can be selectively metering desired amounts of initiator, optional components and/or other monomers, and ancillary components or other additives to the mixer 22. It will be appreciated that the initiator can be introduced in the form of polymerizable monomers which are polymerized with or separately from monomer(s) that form the adhesive.

After appropriate mixing of the adhesive, polymers and/or monomers, photoinitiators, and optional components, the resulting pre-adhesive is directed through line 24 to a reactor 26 which can be in the form of a tube reactor for example. The reactor 26 can be in a variety of different forms however typically defines an interior region for receiving adhesive or pre-adhesive. The reactor 26 is configured to allow actinic radiation such as UV radiation to enter the interior of the reactor from one or more radiation sources as described herein. The adhesive or pre-adhesive is directed through the reactor 26 and exposed to actinic radiation from UV emitters 28, 30 that emit UV light or radiation shown as rays 29, 31 for example, having a wavelength corresponding to an activation wavelength of the photoinitiator group and/or the initiators. The flow rate, i.e., residence time of adhesive or pre-adhesive in the reactor 26; intensity of the UV light; and other factors are adjusted to produce a partially or fully polymerized adhesive exiting the reactor 26 via line 32. Polymerization between monomer(s) primarily occurs in the reactor 26. It is contemplated that thermal-based polymerization of monomers could be performed instead of, or in addition to, radiation-based polymerization.

The adhesive partially or fully polymerized in line 32 may be directly deposited or applied to one or more substrates on a moving web 42 (typically driven by rotating roller 40) via line 34, or directed via line 36 to a storage unit 44 for additional processing and/or subsequent application.

Upon deposition of the adhesive shown in FIG. 1 as regions 46, the adhesive typically on the moving web 42, is irradiated by another UV emitter in a stage 50 that directs UV rays 51 upon the regions 46 to crosslink the adhesive. Crosslinked adhesive 52 results.

Articles

The present subject matter provides a wide array of articles that include the noted compositions, pre-adhesives, and/or adhesives. Examples of such articles include adhesive tapes including double sided and single sided tapes; label stock; label constructions; packaging products and assemblies including food packages, packaging for household goods and industrial goods and particularly reclosable packages; and other items.

Figure 2:
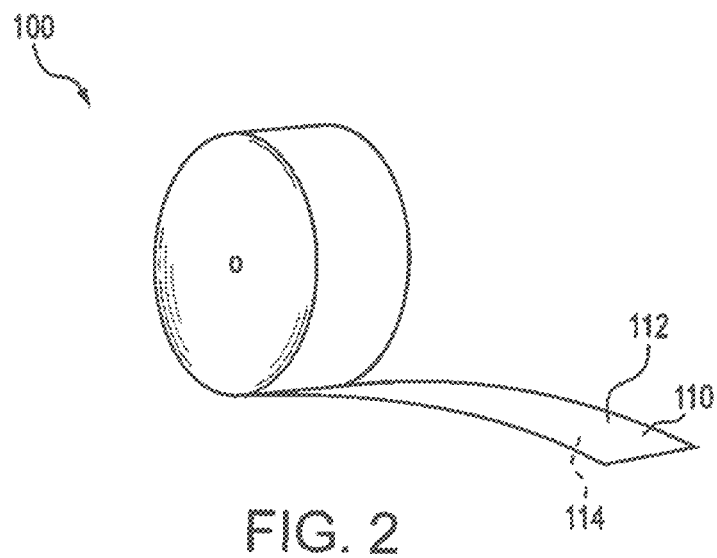
FIG. 2 is a schematic illustration of a tape article including an adhesive in accordance with the present subject matter.

FIG. 2 illustrates a tape article 100 in accordance with an embodiment of the present subject matter. The tape article 100 is shown in a roll form, however, it will be appreciated that the tape could be in a flat, sheet, or Z-fold form. The tape article 100 generally includes a substrate 110 defining a first face 112 and an oppositely directed second face 114. The tape 100 includes a layer or region of an adhesive as described herein disposed on one or both faces 112, 114. One or more release liners and/or low surface energy coatings can be used as described in greater detail herein.

Figure 3:
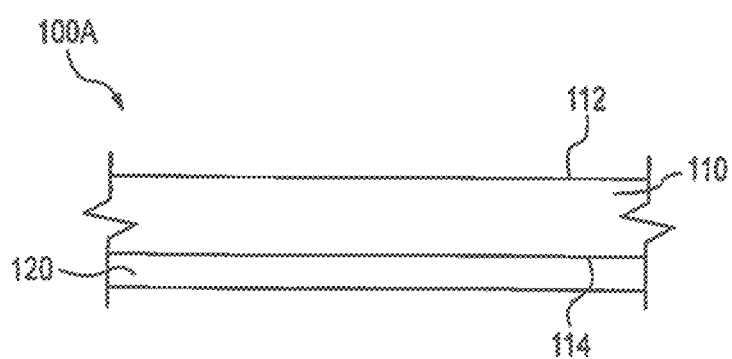
FIG. 3 is a schematic cross sectional view of another tape article in accordance with the present subject matter.

FIG. 3 is a schematic cross sectional view of a tape 100A comprising a substrate 110 defining a first face 112 and an oppositely directed second face 114. The tape 100A also comprises a layer or region of an adhesive 120 disposed on one of the faces such as for example face 114. One or more low surface energy coatings can be disposed on the face 112 of the substrate 110.

Figure 4:
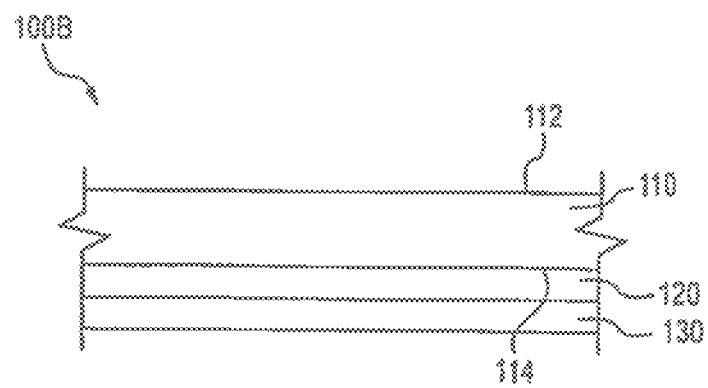
FIG. 4 is a schematic cross sectional view of another tape article in accordance with the present subject matter.

FIG. 4 is a schematic cross sectional view of a tape 100B comprising a substrate 110 defining a first face 112 and an oppositely directed second face 114. The tape 100B also comprises a layer or region of an adhesive 120 disposed on one of the faces such as for example face 114. The tape 100B also comprises a release liner 130 covering the adhesive 120. One or more low surface energy coatings can be disposed on the face 112 of the substrate 110.

Figure 5:
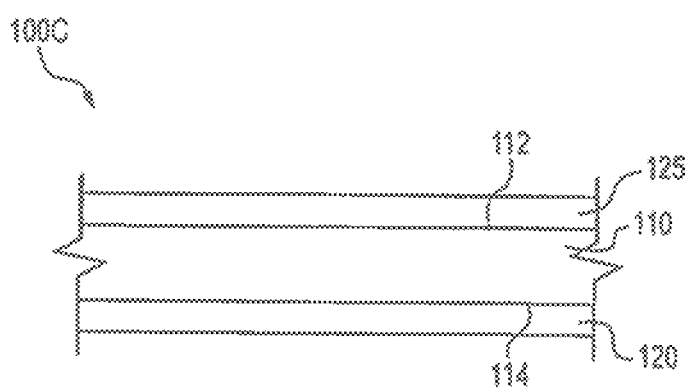
FIG. 5 is a schematic cross sectional view of another tape article in accordance with the present subject matter.

FIG. 5 is a schematic cross sectional view of a tape 100C comprising a substrate 110 defining a first face 112 and an oppositely directed second face 114. The tape 100C also comprises a first layer or region of an adhesive 120 disposed on one of the faces such as for example face 114. The tape 100C also comprises a second layer or region of an adhesive 125 disposed on the face 112 of the substrate 110.

Figure 6:
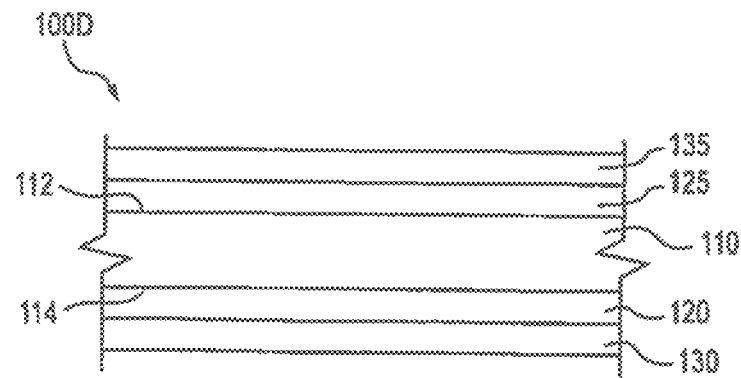
FIG. 6 is a schematic cross sectional view of another tape article in accordance with the present subject matter.

FIG. 6 is a schematic cross sectional view of a tape 100D comprising a substrate 110 defining a first face 112 and an oppositely directed second face 114. The tape 100D also comprises a first layer or region of an adhesive 120 disposed on one of the faces such as for example face 114. The tape 100D also comprises a second layer or region of an adhesive 125 on the face 112. The tape 100D also comprises a first release liner 130 covering the adhesive 120. And, the tape 100D additionally comprises a second release liner 135 covering the adhesive 125.

Figure 7:
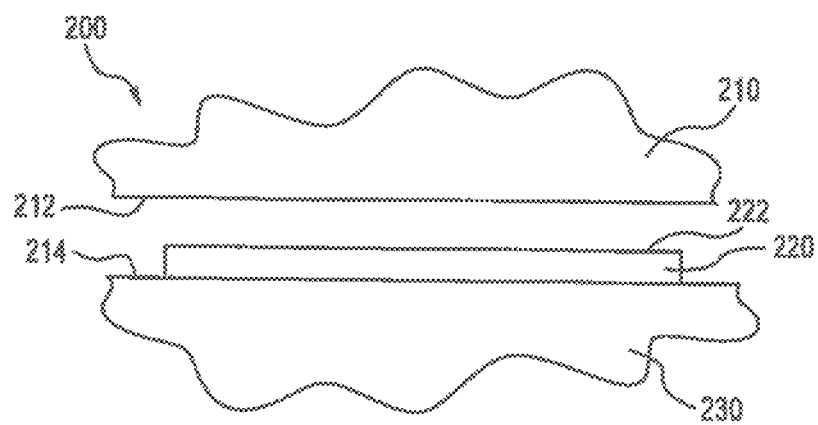
FIG. 7 is a schematic cross sectional view of a sealing or closure assembly including a region of an adhesive in accordance with the present subject matter.
Figure 8:
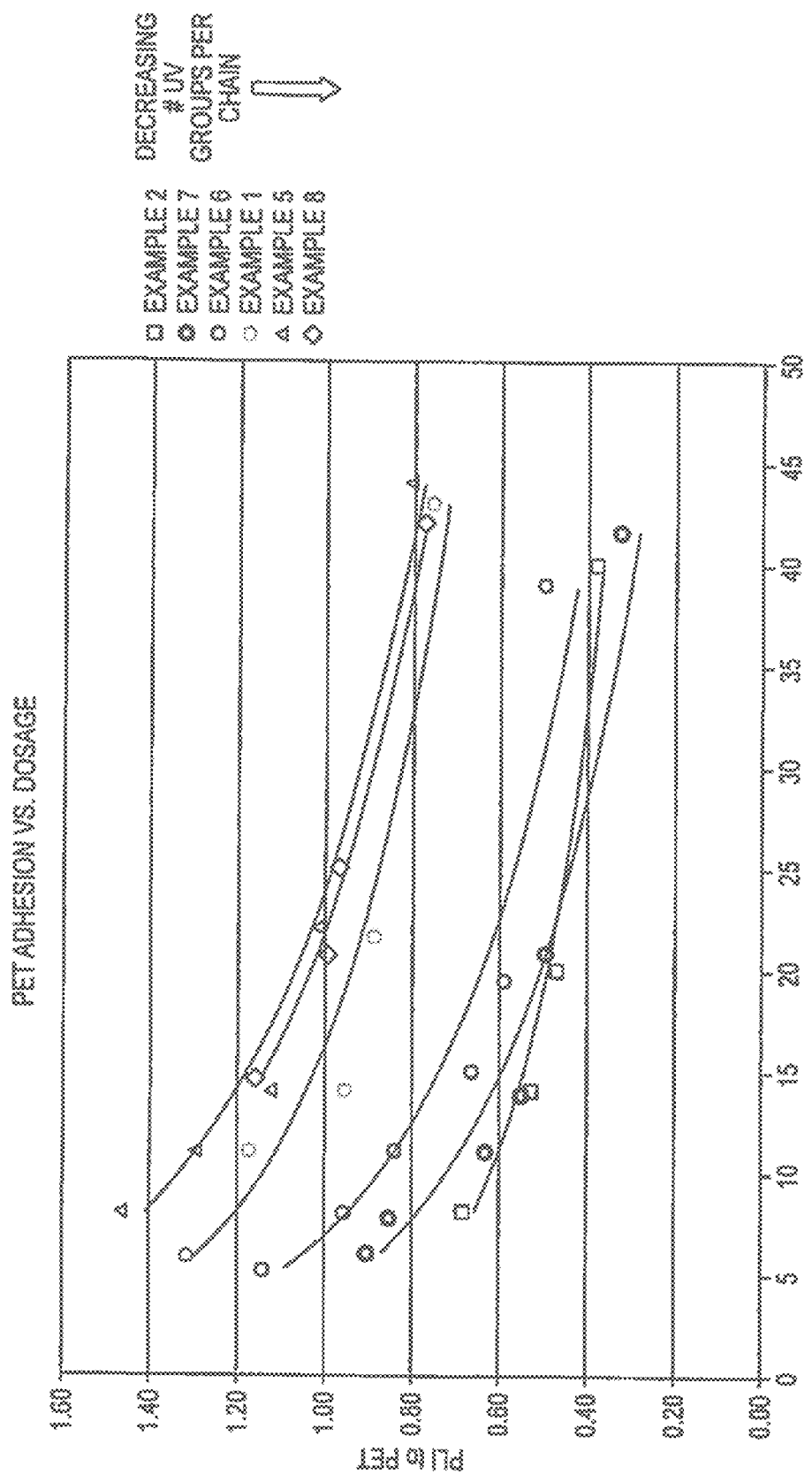
FIG. 8 is a graph of adhesion versus dosage for samples described in examples herein.
Figure 9:
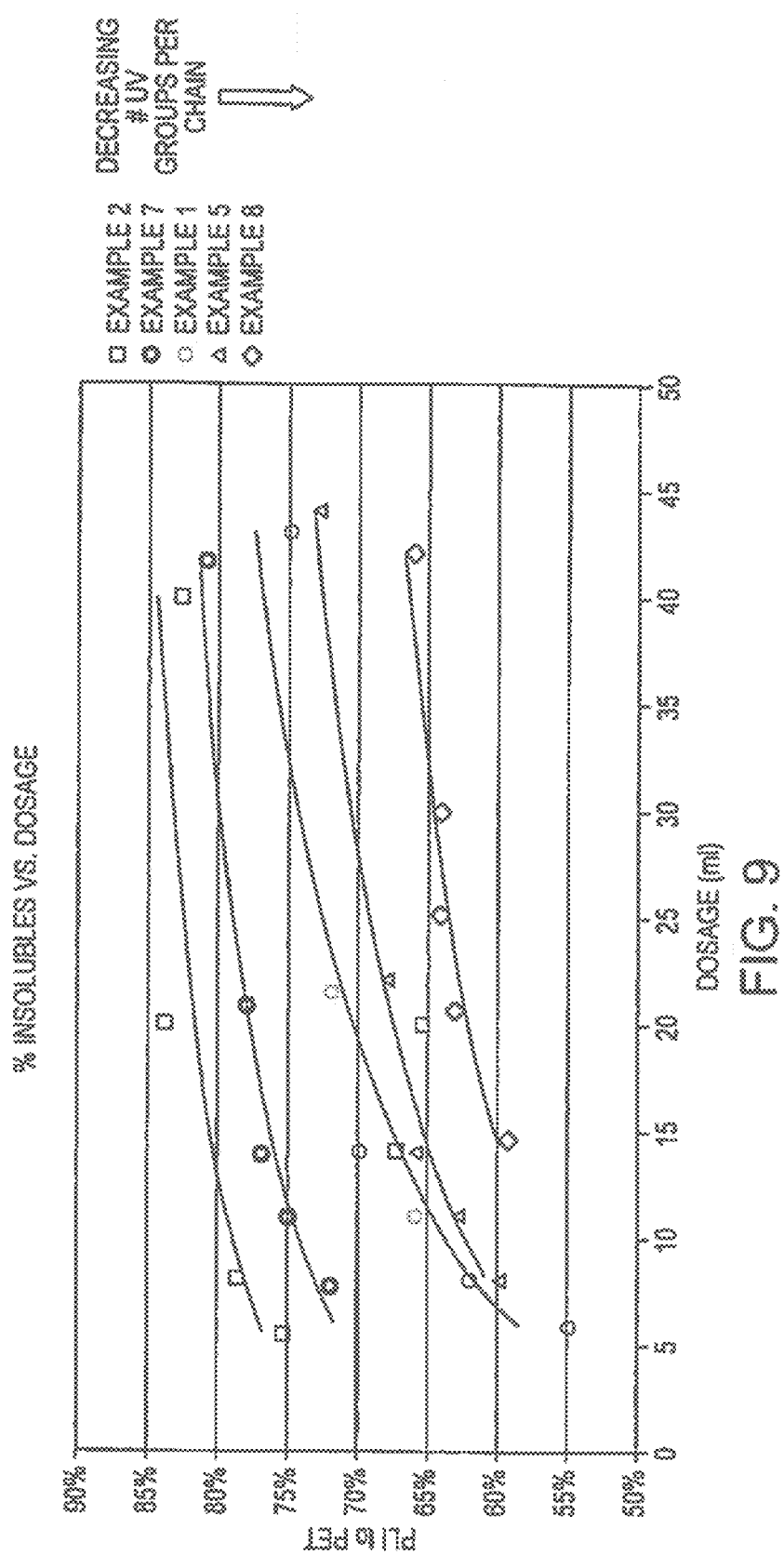
FIG. 9 is a graph of percentage of insolubles versus dosage for samples described in examples herein.

FIG. 7 is a schematic cross sectional view of a sealing, closure, or reclosure assembly 200 in accordance with the present subject matter. This assembly comprises a first substrate 210 defining a first substrate face 212, a second substrate 230 defining a second substrate face 214, and one or more layers or regions of an adhesive 220 defining an adhesive face 222. The adhesive 220 is disposed on one or both substrate faces 212, 214. The adhesive 220 serves to seal and/or adhere the substrates 210, 230 together upon contact between the adhesive face 222 and the substrate face 212. As will be understood, the adhesive 220 is any of the adhesives described herein. The assembly 200 can be utilized in association with and/or incorporated in a wide array of packaging products including for example food packages, packages for household goods, industrial goods packages, and in particular recloseable packages.

The adhesive layer may have a thickness as desired for a particular purpose or intended use. In one embodiment, the adhesive layer may have a thickness from about 10 to about 125, or from about 10 to about 75, or from about 10 to about 50 microns. In one embodiment, the coat weight of the adhesive may be in the range of about 10 to about 50 grams per square meter (gsm), and in one embodiment about 20 to about 35 gsm.

Release liners for use in the present subject matter may be those known in the art or those later discovered. In general, suitable release liners include, but are not limited to, polyethylene coated papers with a commercial silicone release coating, polyethylene coated polyethylene terephthalate films with a commercial silicone release coating, or cast polypropylene films that can be embossed with a pattern or patterns while making such films, and thereafter coated with a commercial silicone release coating. An exemplary release liner is kraft paper which has a coating of low density polyethylene on the front side with a silicone release coating and a coating of high density polyethylene or polypropylene on the back side. Other release liners known in the art are also suitable as long as they are selected for their release characteristics relative to the pressure sensitive adhesive chosen for use in the adhesive article, that is, the adhesive will have a greater affinity for the face stock than the liner.

As previously noted, one or more low surface energy coatings can be used in the articles utilizing the adhesives described herein. For example, for rolled tape products it may be desirable to provide a coating of a low surface energy agent along a rear face of a substrate or tape component that contacts the adhesive. Nonlimiting examples of low surface energy coatings include silicone agents, polypropylene or other polyolefins, certain fluorocarbons, and certain fatty acid esters.

A benefit of particular adhesives of the present subject matter involves maintenance of performance criteria upon continued exposure to UV radiation. For example, a disadvantage of many conventional UV cured, randomly crosslinked adhesive networks is that additional UV exposure results in additional crosslinking. This may in turn result in undesirable changes in the adhesive and/or its performance. Specifically, this may be undesirable for clear or transparent labels that are UV printed downstream. In contrast, many embodiments of the present subject matter adhesives do not exhibit performance changes upon additional UV exposure.

EXAMPLES

The following test methods were used for evaluating the adhesive properties of various acrylic adhesives.

TABLE 2

PSA Performance Test Methods

| Test | Condition |
|---|---|
| 90° Peel | a, b, c, d |
| 20 minute dwell | |
| 24 hour dwell | |
| 1 week dwell | |
| 1 month | |
| % Insoluble Polymer | e |
| Melt Flow | f |

(a) Peel, sample applied to a polyethylene terephthalate (PET) panel with a 5 pound roller with 5 passes in each direction. Samples conditioned and tested at 23° C.
(b) Peel, sample applied to a polyethylene terephthalate (PET) film applied to a rigid PVC panel with double sided tape with a 5 pound roller with 5 passes in each direction. Samples conditioned and tested at 23° C.
(c) Peel, sample applied to a high density polyethylene with a 5 pound roller with 5 passes in each direction. Samples conditioned and tested at 23° C.
(d) Peel, sample applied to a high density polypropylene with a 5 pound roller with 5 passes in each direction. Samples conditioned and tested at 23° C.
(e) % Insoluble polymer: 0.05-0.10 grams of cured polymer is sealed in a 5 micrometer porous PFTE membrane filter and tumbled in tetrahydrofuran (THF) for 1 week. The weight of polymer before soak and after soak is measured to achieve a % of polymer that was insoluble in the THF.
(f) Melt flow was measured with an AR2000 Rheometer fitted with a stainless steel 2° cone and plate. Examples were evaluated at 0.25 sec$^{-1}$ and a gap of 100 micrometer. Temperature was ramped at 0.5° C. per minute after a ten minute equilibration time at the starting temperature.

The present subject matter is further described by reference to the following non-limiting examples.

Example 1

Preparation of Segmented Acrylic Polymer Having Benzophenone Functionality Using SFRP Agent (KH9-76-2 Per Chain)

An acrylic copolymer with reactive functionalities positioned in the segment adjacent to the polymer chain end is prepared as follows. Into a 1500 ml reactor equipped with a heating jacket, agitator, reflux condenser, feed tanks and nitrogen gas inlet there is charged 4.36 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.
55.92 g Butyl Acrylate
55.92 g 2-Ethyl Hexyl Acrylate
1.13 g Acrylic Acid
6.00 g 4-Methacrylic Benzophenone
110.50 g Propyl Acetate The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,408 g/mol. During the 60 minute hold, a reagent feed mixture with an active nitrogen purge of 181.47 g propyl acetate, 503.31 g butyl acrylate, 503.31 g 2-ethylhexyl acrylate and 10.17 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 5.99 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,591 g/mol. At this time, the polymer is cooled to 85° C. Once the polymer is below 90° C., 11.43 g of butyl acrylate is added to the reactor and allowed to mix for 15 minutes. Once the polymer is 85° C., 5.67 g of tertiary amyl peroxy pivalate and 50.80 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. At the end of the 2 hour hold, 34.50 g of Foral 85LB pre-dissolved in 14.78 g ethyl acetate is added to the polymer. The resulting solution polymer is then cooled to ambient temperature and discharged from the reactor.

Example 2

Preparation of Segmented Acrylic Polymer Having Benzophenone Functionality Using SFRP Agent (KH9-68-4 Per Chain)

An acrylic copolymer with reactive functionalities positioned in the segment adjacent to the polymer chain end is prepared as follows. Into a 1500 ml reactor equipped with a heating jacket, agitator, reflux condenser, feed tanks and nitrogen gas inlet there is charged 4.34 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.
55.70 g Butyl Acrylate
55.70 g 2-Ethyl Hexyl Acrylate
1.13 g Acrylic Acid
11.95 g 4-Methacrylic Benzophenone
110.06 g Propyl Acetate The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,933 g/mol. During the 60 minute hold, a reagent feed mixture with an active nitrogen purge of 180.74 g propyl acetate, 501.29 g butyl acrylate, 501.29 g 2-ethylhexyl acrylate and 10.13 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 5.96 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,066 g/mol. At this time, the polymer is cooled to 85° C. Once the polymer is below 90° C., 11.39 g of butyl acrylate is added to the reactor and allowed to mix for 15 minutes. Once the polymer is 85° C., 5.68 g of tertiary amyl peroxy pivalate and 50.60 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. At the end of the 2 hour hold, 35.54 g of Foral 85LB pre-dissolved in 15.23 g ethyl acetate is added to the polymer. The resulting solution polymer is then cooled to ambient temperature and discharged from the reactor.

Example 3

Preparation of Segmented Acrylic Polymer Having Benzophenone Functionality Using SFRP Agent (KH9-75-2.6 Per Chain)

An acrylic copolymer with reactive functionalities positioned in the segment adjacent to the polymer chain end is prepared as follows. Into a 1500 ml reactor equipped with a heating jacket, agitator, reflux condenser, feed tanks and nitrogen gas inlet there is charged 4.35 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.
  55.85 g Butyl Acrylate
  55.85 g 2-Ethyl Hexyl Acrylate
  1.13 g Acrylic Acid
  7.99 g 4-Methacrylic Benzophenone
  110.35 g Propyl Acetate
The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,408 g/mol. During the 60 minute hold, a reagent feed mixture with an active nitrogen purge of 181.23 g propyl acetate, 502.64 g butyl acrylate, 502.64 g 2-ethylhexyl acrylate and 10.15 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 5.98 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,591 g/mol. At this time, the polymer is cooled to 85° C. Once the polymer is below 90° C., 11.42 g of butyl acrylate is added to the reactor and allowed to mix for 15 minutes. Once the polymer is 85° C., 5.68 g of tertiary amyl peroxy pivalate and 50.74 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. The resulting solution polymer is then cooled to ambient temperature and discharged from the reactor.

Example 4

Preparation of Segmented Acrylic Polymer Having Benzophenone Functionality Using SFRP Agent (KH9-21-1.3 Per Chain)

An acrylic copolymer with reactive functionalities positioned in the segment adjacent to the polymer chain end is prepared as follows. Into a 1500 ml reactor equipped with a heating jacket, agitator, reflux condenser, feed tanks and nitrogen gas inlet there is charged 3.63 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.
  46.67 g Butyl Acrylate
  46.67 g 2-Ethyl Hexyl Acrylate
  0.94 g Acrylic Acid
  3.34 g 4-Methacrylic Benzophenone
  92.21 g Propyl Acetate
The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,408 g/mol. During the 60 minute hold, a reagent feed mixture with an active nitrogen purge of 151.43 g propyl acetate, 419.99 g butyl acrylate, 419.99 g 2-ethylhexyl acrylate and 8.48 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 4.89 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,591 g/mol. At this time, the polymer is cooled to 85° C. Once the polymer is below 90° C., 9.54 g of butyl acrylate is added to the reactor and allowed to mix for 15 minutes. Once the polymer is 85° C., 4.73 g of tertiary amyl peroxy pivalate and 42.39 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. The resulting solution polymer is then cooled to ambient temperature and discharged from the reactor.

Example 5

Preparation of Segmented Acrylic Polymer Having Benzophenone Functionality Using SFRP Agent (KH9-77-1.65 Per Chain))

An acrylic copolymer with reactive functionalities positioned in the segment adjacent to the polymer chain end is prepared as follows. Into a 1500 ml reactor equipped with a heating jacket, agitator, reflux condenser, feed tanks and nitrogen gas inlet there is charged 4.36 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

55.96 g Butyl Acrylate
55.96 g 2-Ethyl Hexyl Acrylate
1.13 g Acrylic Acid
5.00 g 4-Methacrylic Benzophenone
110.57 g Propyl Acetate The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,408 g/mol. During the 60 minute hold, a reagent feed mixture with an active nitrogen purge of 181.59 g propyl acetate, 503.65 g butyl acrylate, 503.65 g 2-ethylhexyl acrylate and 10.17 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 5.99 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,591 g/mol. At this time, the polymer is cooled to 85° C. Once the polymer is below 90° C., 11.44 g of butyl acrylate is added to the reactor and allowed to mix for 15 minutes. Once the polymer is 85° C., 5.67 g of tertiary amyl peroxy pivalate and 50.84 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. At the end of the 2 hour hold, 32.52 g of Foral 85LB pre-dissolved in 13.94 g ethyl acetate is added to the polymer. The resulting solution polymer is then cooled to ambient temperature and discharged from the reactor.

Example 6

Preparation of Segmented Acrylic Polymer Having Benzophenone Functionality Using SFRP Agent (KH9-81-2.3 Per Chain)

An acrylic copolymer with reactive functionalities positioned in the segment adjacent to the polymer chain end is prepared as follows. Into a 1500 ml equipped with a heating jacket, agitator, reflux condenser, feed tanks and nitrogen gas inlet there is charged 4.35 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

55.89 g Butyl Acrylate
55.89 g 2-Ethyl Hexyl Acrylate
1.13 g Acrylic Acid
7.00 g 4-Methacrylic Benzophenone
110.43 g Propyl Acetate The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,408 g/mol. During the 60 minute hold, a reagent feed mixture with an active nitrogen purge of 181.35 g propyl acetate, 502.97 g butyl acrylate, 502.97 g 2-ethylhexyl acrylate and 10.16 g acrylic acid is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 5.99 grams/min until the mixture is depleted. During the reagent feeds the temperature of the reaction is held at 118-122° C. The reaction conditions are maintained after completion of the reagent feed until a conversion of at least 97% of butyl acrylate and 2-ethylhexyl acrylate is achieved. This is to create the remainder of the non-UV functional segment adjacent to the UV functional segment at the end of the polymer. The total theoretical Mn of the non-UV functional segment is 89,591 g/mol. At this time, the polymer is cooled to 85° C. Once the polymer is below 90° C., 11.42 g of butyl acrylate is added to the reactor and allowed to mix for 15 minutes. Once the polymer is 85° C., 5.67 g of tertiary amyl peroxy pivalate and 50.77 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. At the end of the 2 hour hold, 35.61 g of Foral 85LB pre-dissolved in 15.26 g ethyl acetate is added to the polymer. The resulting solution polymer is then cooled to ambient temperature and discharged from the reactor.

Example 7

Formulation of Example 3 (AK9-97)

Three percent Foral 85LB was added to the polymer of Example 3 based on solid content to result in a 97:3 ratio polymer to tackifier.

Example 8

Formulation of Example 4 (AK9-65)

Three percent Foral 85LB was added to the polymer of Example 4 based on solid content to result in a 97:3 ratio polymer to tackifier.

Example 9

Comparative Example from Commercial Supplier

This adhesive is a formulated high molecular weight solvent acrylic polymer.

Example 10

Comparative Example from Commercial Supplier

This adhesive is a formulated high molecular weight solvent acrylic polymer.

Table 3 summarizes Examples 1-10.

TABLE 3

Summary of Examples 1-10

| | Example | | | | | | | | | |
|---|---|---|---|---|---|---|---|---|---|---|
| | 1 | 2 | 3 | 4 | 5 | 6 | 7 | 8 | 9 | 10 |
| Lot | 76 | 68 | 75 | 21 | 77 | 81 | AK9-97 | AK9-65 | Commercial | Commercial |
| #bp/ch | 2 | 4 | 2.6 | 1.3 | 1.65 | 2.3 | 97% | 97% | Control | Control |
| Solids | 76.92% | 77.01% | 77.18% | 77.12% | 76.92% | 77.09% | Ex. 3 | Ex. 4 | 39% | 26% |
| BA | 49.74% | 49.49% | 49.66% | 49.83% | 49.79% | 49.70% | | | — | — |
| EHA | 48.75% | 48.49% | 48.66% | 48.83% | 48.79% | 48.71% | | | | |
| AA | 0.99% | 0.98% | 0.98% | 0.99% | 0.99% | 0.98% | | | | |
| 4MABP | 0.52% | 1.04% | 0.70% | 0.35% | 0.44% | 0.61% | | | | |
| Total | 100.00% | 100.00% | 100.00% | 100.00% | 100.00% | 100.00% | | | | |
| Parts Foral | 2.89% | 2.89% | 0.00% | 0.00% | 2.73% | 3.19% | 3.00% | 3.00% | 0.00% | 0.00% |
| Mn (g/mol) | 55223 | 59709 | See Ex. 7 | See Ex. 8 | 52849 | 55130 | 56388 | 44202 | 112718 | 302632 |
| Mw (g/mol) | 186276 | 194747 | | | 169349 | 182701 | 197077 | 191279 | 463059 | 929513 |
| PDI | 3.37 | 3.26 | | | 3.20 | 3.31 | 3.50 | 4.33 | 4.11 | 3.07 |

Test Results

The adhesives of Examples 1, 2, 5, 6, 7, and 8 were coated onto 2-mil polyethylene terephthalate with a 100% solids platinum cured silicone release layer at 10-12 grams per square meter (gsm) and dried at ambient temperature for 15 minutes followed by 50° C. for 15 minutes to isolate the formulation from solvent. After drying, the coating was cured with UV radiation at various energy densities to achieve various cure levels. The cured coating was then laminated to a 2 mil BOPP film and dwelled in a 50° C. oven for 24 hours followed by a 24 hour dwell in a climate controlled room at 75° F. and 50% humidity before testing.

The Comparative Examples 9 and 10 were obtained from Avery Dennison.

Figure 10:
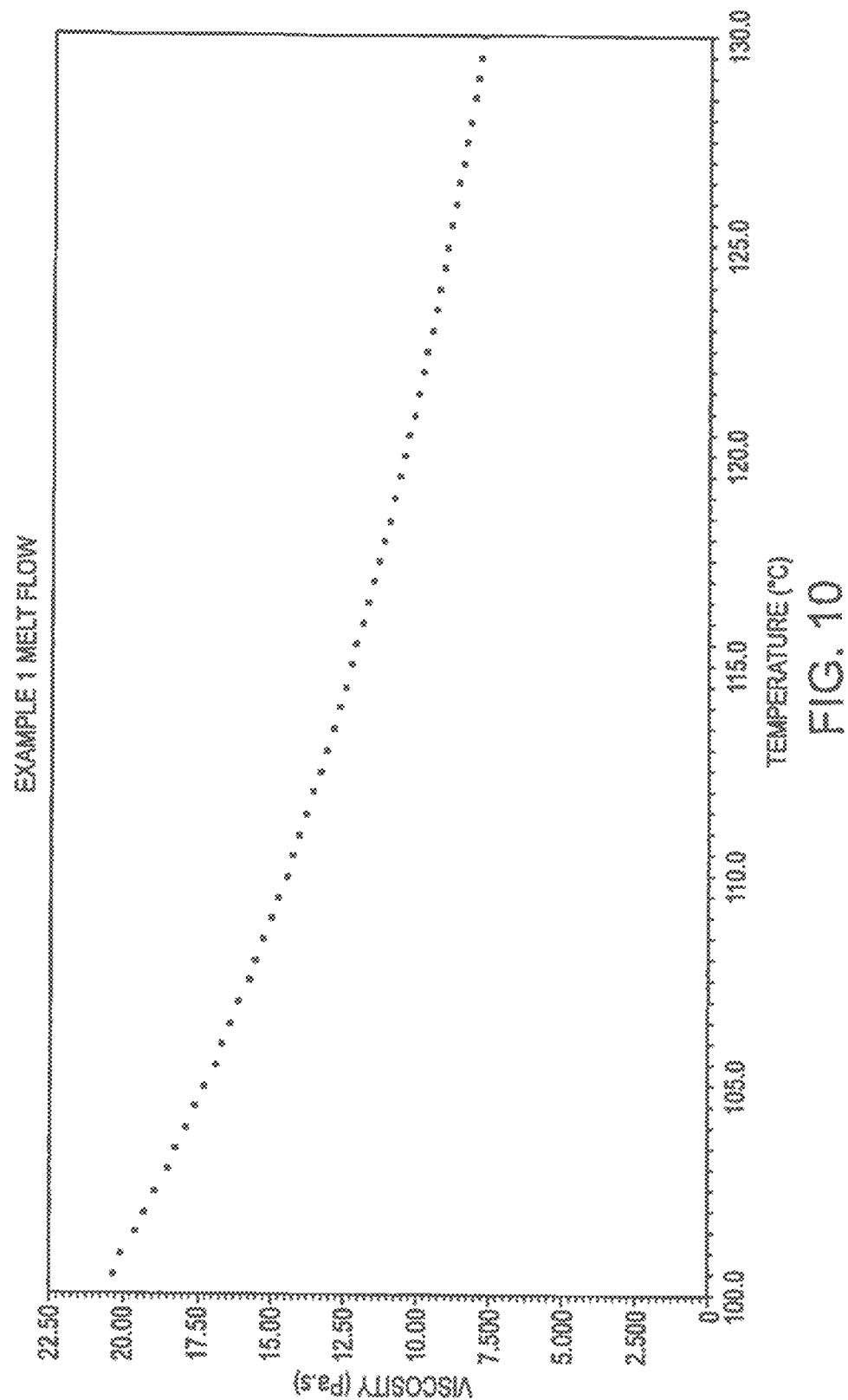
FIG. 10 is a graph of melt flow viscosity versus temperature for samples of Example 1 herein.
Figure 11:
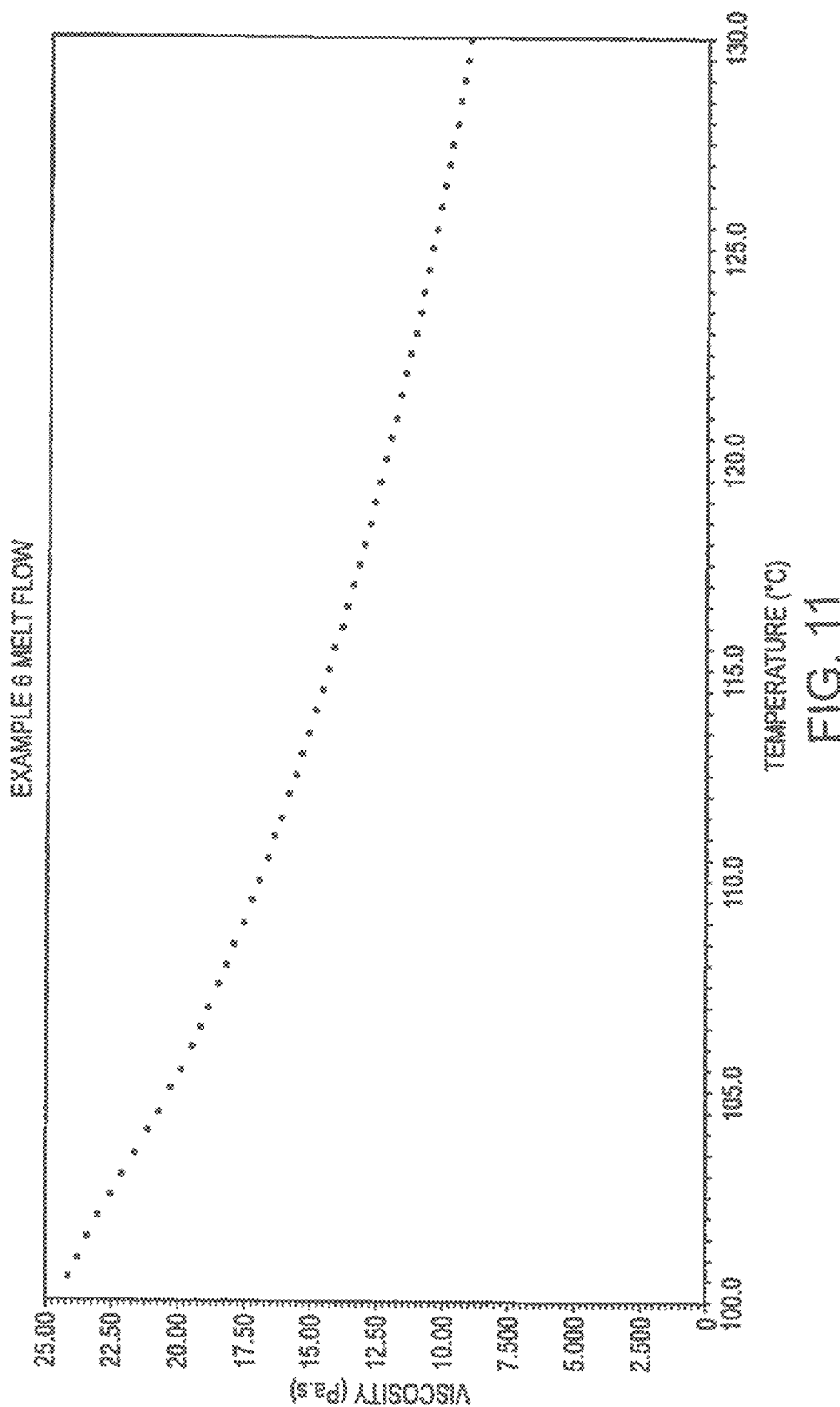
FIG. 11 is a graph of melt flow viscosity versus temperature for samples of Example 6 herein.

FIGS. 10 and 11 present results of evaluations of samples from various examples.

Tables 4-7 present results of evaluations and compare 90° peel adhesion trials of samples from Examples 1, 9, and 10.

TABLE 4

Comparing Examples 1, 9, and 10

| | Coatweight | 90° Peel adhesion to Rigid PET panel (pli) | | | |
|---|---|---|---|---|---|
| | (gsm) | 20 min | 24 hr | 1 week | 1 month |
| Example 1 cured @ 5 mJ/cm² UV-C | 12.5 | 1.32 | 1.36 | 1.43 | 1.45 |
| Example 1 cured @ 9 mJ/cm² UV-C | 10.0 | 0.93 | 0.90 | 0.96 | 1.02 |
| Comparative Example 9 | 17.5 | 1.17 | 1.23 | 1.32 | 1.28 |
| Comparative Example 10 | 17.5 | 1.16 | 1.23 | 1.30 | 1.29 |

TABLE 5

Comparing Examples 1, 9, and 10

| | Coatweight | 90° Peel adhesion to Flexible PET film (pli) | | | |
|---|---|---|---|---|---|
| | (gsm) | 20 min | 24 hr | 1 week | 1 month |
| Example 1 cured @ 5 mJ/cm2 UV-C | 12.5 | 0.98 | n/a | 1.14 | n/a |
| Example 1 cured @ 9 mJ/cm2 UV-C | 10.0 | 0.63 | n/a | 0.81 | n/a |
| Comparative Example 9 | 17.5 | 0.88 | n/a | 0.98 | n/a |
| Comparative Example 10 | 17.5 | 0.74 | n/a | 0.99 | n/a |

TABLE 6

Comparing Examples 1, 9, and 10

| | Coatweight | 90° Peel adhesion to Rigid PP panel (pli) | | | |
|---|---|---|---|---|---|
| | (gsm) | 20 min | 24 hr | 1 week | 1 month |
| Example 1 cured @ 5 mJ/cm² UV-C | 12.5 | 0.79 | 0.80 | 0.84 | 0.80 |
| Example 1 cured @ 9 mJ/cm² UV-C | 10.0 | 0.60 | 0.59 | 0.63 | 0.67 |
| Comparative Example 9 | 17.5 | 0.71 | 0.74 | 0.78 | 0.67 |
| Comparative Example 10 | 17.5 | 0.60 | 0.61 | 0.63 | 0.64 |

TABLE 7

Comparing Examples 1, 9, and 10

| | Coatweight | 90° Peel adhesion to Rigid HDPE panel (pli) | | | |
|---|---|---|---|---|---|
| | (gsm) | 20 min | 24 hr | 1 week | 1 month |
| Example 1 cured @ 5 mJ/cm² UV-C | 12.5 | 0.53 | 0.55 | 0.59 | 0.55 |
| Example 1 cured @ 9 mJ/cm² UV-C | 10.0 | 0.34 | 0.36 | 0.40 | 0.42 |
| Comparative Example 9 | 17.5 | 0.30 | 0.34 | 0.35 | 0.41 |
| Comparative Example 10 | 17.5 | 0.21 | 0.25 | 0.23 | 0.29 |

Figure 12:
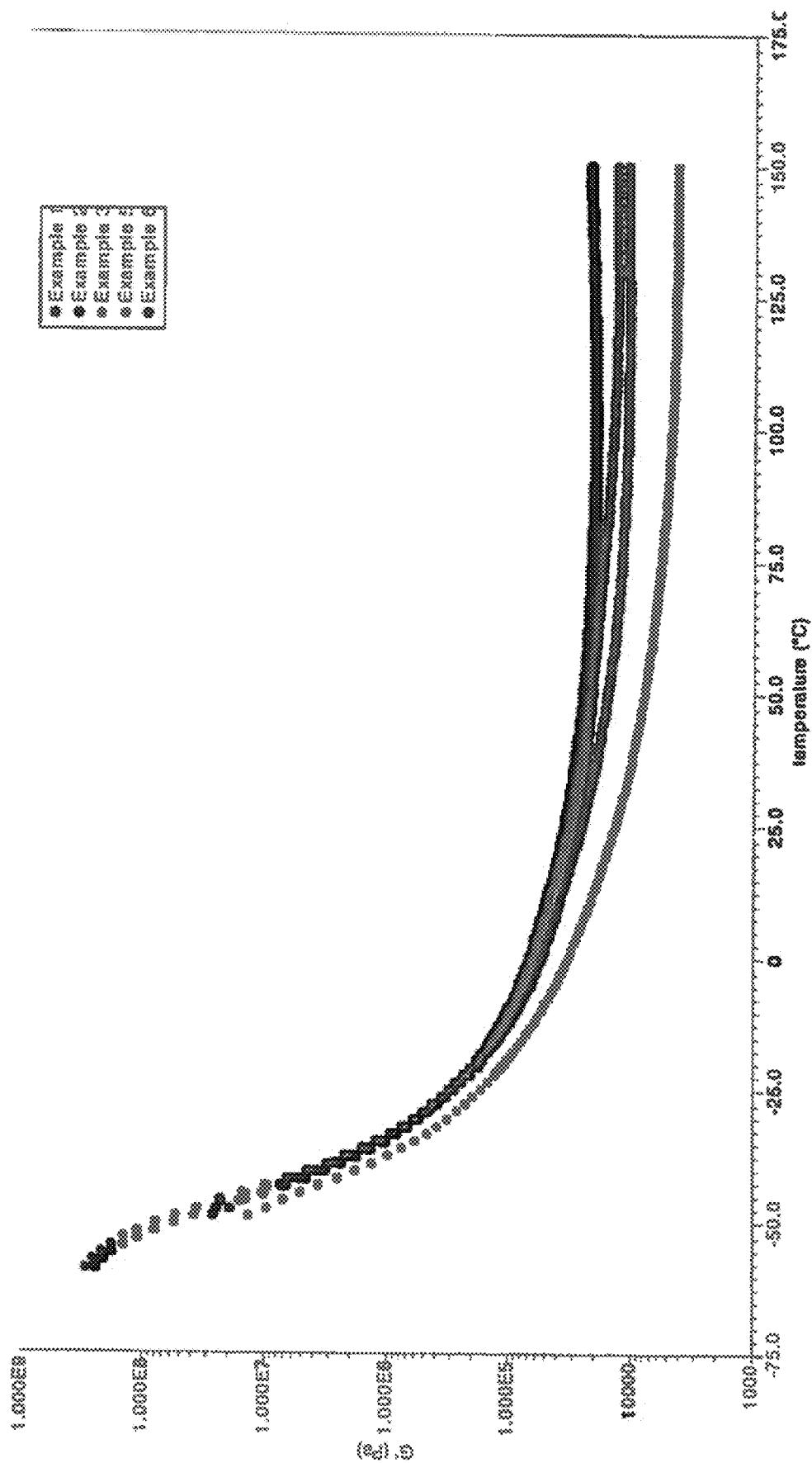
FIG. 12 is a plot of elastic/storage modulus as a function of temperature for samples of Examples 1-3, 5, and 6 described herein.

FIGS. 12 and 13 present results of melt flow evaluations of samples of Examples 1 and 6.

Example #11

Preparation of Segmented Acrylic Polymer Having Benzophenone Functionality Using SFRP Agent (KH8-15-Pseudo Telechelic->2.5 Per Chain End)

An acrylic copolymer with reactive functionalities positioned in the segment adjacent to the polymer chain ends is prepared as follows. Into a 1500 ml reactor equipped with a heating jacket, agitator, reflux condenser, feed tanks and nitrogen gas inlet there is charged 2.89 g of BlocBuilder MA (SFRP Agent). The reactor is then inerted with nitrogen for 1 hour at 0.5 litre/min. Monomers and solvents are added in the following amounts to a feed vessel and inerted with nitrogen for 1 hour at 0.5 litre/min. After inertion, the monomer and solvent mix was added to the reactor to generate the segment adjacent to the polymer chain ends.

74.62 g Butyl Acrylate
6.65 g 4-Methacrylic Benzophenone
73.42 g Propyl Acetate

The reactor charge is heated to reflux conditions (reactor jacket 125° C.) with a constant nitrogen purge. At 100° C., a 60 minute hold is started in which the reaction will reach a reflux during this hold at approximately 112° C. This is to create the UV functional segment with a theoretical Mn of 10,700 g/mol. During the 60 minute hold, a reagent feed mixture with an active nitrogen purge of 84.39 g propyl acetate and 671.62 g butyl acrylate is weighed into a feed vessel and inerted with nitrogen at 0.5 litre/minute. After the initial 60 minute hold, the reagent feed is added over a period of sixty minutes to the reactor at a rate of 2 grams/minute. After the sixty minute feed, the rate is ramped to 4.41 grams/min until the mixture is oxygen depleted. During the reagent feeds the temperature of the reaction is held at 118-122° C. The reaction conditions are maintained after completion of the reagent feed until a conversion of at least 90% of butyl acrylate is achieved. Conversion for this example was 92.3%. This is to create the remainder of the non-UV functional segment adjacent to the UV functional segment at the end of the polymer. The total theoretical Mn of the non-UV functional segment is 88,425 g/mol. Prior to the 92.3% BA conversion, 6.65 g of 4-Methacrylic Benzophenone, 74.62 g of Butyl Acrylate, and 42.00 g of Propyl Acetate are weighed into a feed vessel and inerted with nitrogen at 0.5 litre/min until the mixture is oxygen depleted. After sparging, the reagent feed is added to the reactor at the 92.3% BA conversion at the max feed rate of ~g/min. The reaction is held at 118-122° C. until the BA conversion is >95%. At this time, the polymer is cooled to 85° C. Once the polymer is 85° C., 3.80 g of tertiary amyl peroxy pivalate and 33.76 g propyl acetate are mixed in a 100 mL feed vessel and inerted for 15 minutes with nitrogen at 0.5 litre/minute. After inertion, the pivalate solution is added to the reactor over ninety minutes. At the completion of the pivalate feed, the reaction temperature is held between 85° C. and 90° C. for 2 hours. The resulting solution polymer is then cooled to ambient temperature and discharged from the reactor. The theoretical molecular weight was 109,825 g/mol Mn and the actual measured to be 42,601 g/mol Mn, 206,800 g/mol Mw, and 4.85 PDI.

TABLE 7

Testing Results for Example #11

| | Coatweight | 90° Peel adhesion to Flexible PET film (pli) | | | |
|---|---|---|---|---|---|
| | (gsm) | 20 min | 24 hr | 1 week | 1 month |
| Example #11 cured @ 12 mJ/cm² UV-C | 12.2 | 0.64 | 0.71 | n/a | n/a |
| Example #11 cured @ 24 mJ/cm² UV-C | 12.2 | 0.41 | 0.42 | n/a | n/a |
| Example #11 cured @ 36 mJ/cm² UV-C | 12.2 | 0.29 | 0.29 | n/a | n/a |

Many other benefits will not doubt become apparent from future application and development of this technology.

Further examples consistent with the present teachings are set out in the following number clauses.

Clause 1. An acrylic polymer comprising:
at least one acrylic block copolymer including
a first reactive segment of controlled molecular weight and position that includes at least one monomer having a functional group selected from the group consisting of a UV active functional group, a reactive functional group, a non-reactive functional group, and combinations thereof; and
a second segment of controlled molecular weight and position that includes at least one monomer having a functional group selected from the group consisting of a reactive functional group, a non-reactive functional group, and combinations thereof.

Clause 2. The acrylic polymer of Clause 1 wherein the first reactive segment includes at least one monomer having a UV active functional group, at least one monomer having a reactive functional group, and at least one monomer having a non-reactive functional group.

Clause 3. The acrylic polymer of Clause 1 or 2 wherein the first reactive segment includes at least one monomer having a UV active functional group and at least one monomer having a non-reactive functional group.

Clause 4. The acrylic polymer of any one of Clauses 1 to 3 wherein the second segment includes at least one monomer having a reactive functional group and at least one monomer having a non-reactive functional group.

Clause 5. The acrylic polymer of any one of Clauses 1 to 4 wherein the second segment includes at least one monomer having a non-reactive functional group.

Clause 6. The acrylic polymer of any one of Clauses 1 to 5 wherein the first reactive segment includes at least one monomer having a non-reactive functional group and at least one polymerizable comonomer having a crosslinkable functionality, the crosslinkable functionality selected from the group consisting of a UV active functional group, a reactive functional group, and combinations thereof.

Clause 7. The acrylic polymer of any one of Clauses 1 to 6 wherein the first reactive segment includes at least one monomer having a non-reactive functional group and at least one polymerizable comonomer having a crosslinkable functionality, the crosslinkable functionality is a UV active functional group.

Clause 8. The acrylic polymer of any one of Clauses 1 to 7 wherein the at least one monomer having a non-reactive functional group within the first reactive segment is the same type of monomer having a non-reactive functional group present in the second reactive segment.

Clause 9. The acrylic polymer of any one of Clauses 1 to 8 wherein the at least one monomer having a reactive functional group within the first reactive segment is the same type of monomer having a reactive functional group present in the second reactive segment.

Clause 10. The acrylic polymer of any one of Clauses 1 to 9 wherein the at least one monomer having a reactive functional group includes at least one monomer derived from the formula (II):

where R is H or $CH_3$ and X includes a functional group capable of crosslinking,
wherein the functional group includes at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

Clause 11. The acrylic polymer of any one of Clauses 1 to 10 wherein the at least one monomer having a reactive functional group includes at least one functionalized monomer derived from the formula (I):

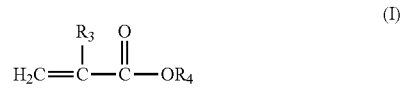

where $R_3$ is H or $CH_3$ and $R_4$ is a branched or unbranched, saturated alkyl group having 4 to 14 carbon atoms.

Clause 12. The acrylic polymer of any one of Clauses 1 to 11 wherein the at least one functionalized monomer includes a crosslinkable functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

Clause 13. The acrylic polymer of any one of Clauses 1 to 12 wherein the at least one monomer having a non-reactive functional group includes at least one monomer derived from the formula (I):

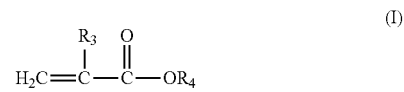

where $R_3$ is H or $CH_3$ and $R_4$ is a branched or unbranched, saturated alkyl group having 4 to 14 carbon atoms.

Clause 14. The acrylic polymer of any one of Clauses 1 to 13 wherein the at least one monomer having a non-reactive functional group is derived from $C_1$ to about $C_{20}$ alkyl, aryl, or cyclic acrylates or $C_1$ to about $C_{20}$ alkyl, aryl, or cyclic methacrylates.

Clause 15. The acrylic polymer of any one of Clauses 1 to 14 wherein the first reactive segment includes about 40% to about 99% by weight of the at least one monomer having a non-reactive functional group.

Clause 16. The acrylic polymer of any one of Clauses 1 to 15 wherein the at least one monomer having a UV active functional group is about 10% or less by weight of the total polymer weight.

Clause 17. The acrylic polymer of any one of Clauses 1 to 16 wherein the second segment is non-reactive with the UV active functional group and/or the reactive functional group.

Clause 18. The acrylic polymer of any one of Clauses 1 to 17 wherein the at least one monomer having a non-reactive functional group is non-reactive with the UV active functional group and/or the reactive functional group.

Clause 19. The acrylic polymer of any one of Clauses 1 to 18 wherein the first reactive segment and the second segment are positioned adjacent to the polymer chain ends.

Clause 20. The acrylic polymer of any one of Clauses 1 to 19 wherein the reactive functional groups and/or the non-reactive functional groups are randomly spaced apart along the length of the polymer chain.

Clause 21. The acrylic polymer of any one of Clauses 1 to 20 wherein the first reactive segment comprises 40% or less of the total polymer molecular weight.

Clause 22. The acrylic polymer of any one of Clauses 1 to 21 wherein the first reactive segment and the second segment are molecularly miscible before cure.

Clause 23. The acrylic polymer of any one of Clauses 1 to 22 wherein the acrylic polymer is a single phase polymer at room temperature.

Clause 24. The acrylic polymer of any one of Clauses 1 to 23 wherein the acrylic polymer is a single phase polymer prior to crosslinking.

Clause 25. The acrylic polymer of any one of Clauses 1 to 24 wherein the first reactive segment and the second segment are molecularly miscible before cure as expressed by their properties in the bulk state that are indicative of a single phase polymer.

Clause 26. The acrylic polymer of any one of Clauses 1 to 25 wherein the acrylic polymer is a single phase liquid polymer at room temperature.

Clause 27. The acrylic polymer of any one of Clauses 1 to 26 wherein the acrylic polymer is a single phase liquid polymer prior to crosslinking.

Clause 28. The acrylic polymer of any one of Clauses 1 to 27 wherein the acrylic polymer is a liquid polymer at room temperature.

Clause 29. The acrylic polymer of any one of Clauses 1 to 28 wherein the acrylic polymer is a liquid polymer prior to crosslinking.

Clause 30. The acrylic polymer of any one of Clauses 1 to 29 wherein the acrylic polymer is a homogeneous polymer at room temperature.

Clause 31. The acrylic polymer of any one of Clauses 1 to 30 wherein the acrylic polymer is a homogeneous polymer prior to crosslinking.

Clause 32. The acrylic polymer of any one of Clauses 1 to 31 wherein the acrylic polymer is a homogeneous liquid polymer prior to crosslinking.

Clause 33. The acrylic polymer of any one of Clauses 1 to 32 wherein the acrylic polymer is a homogeneous liquid polymer at room temperature.

Clause 34. The acrylic polymer of any one of Clauses 1 to 33 wherein the acrylic polymer exhibits no heterogeneity prior to crosslinking.

Clause 35. The acrylic polymer of any one of Clauses 1 to 34 wherein the acrylic polymer exhibits no heterogeneity at room temperature.

Clause 36. The acrylic polymer of any one of Clauses 1 to 35 wherein the glass transition temperature (Tg) of the acrylic polymer is within a range of from about 15° C. to about −115° C.

Clause 37. The acrylic polymer of any one of Clauses 1 to 36 wherein the UV active functional group is selected from the group consisting of benzophenones, double bonds, and combinations thereof.

Clause 38. The acrylic polymer of any one of Clauses 1 to 37 wherein the UV active functional group is a benzophenone.

Clause 39. The acrylic polymer of any one of Clauses 1 to 38 wherein the UV active functional group is represented by Formula (III) as follows:

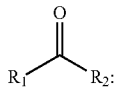

(III)

in which $R_1$ and $R_2$ is each independently an organic radical selected from the group consisting of methyl, aryl, and alkyl.

Clause 40. The acrylic polymer of any one of Clauses 1 to 39 wherein $R_1$ and $R_2$ is each independently an aromatic or substituted aromatic group.

Clause 41. The acrylic polymer of any one of Clauses 1 to 40 wherein $R_1$ and $R_2$ is each independently a phenyl or substituted phenyl group.

Clause 42. The acrylic polymer of any one of Clauses 1 to 41 wherein the UV active functional group is selected from the group consisting of acetophenone, an acetophenone derivative, benzophenone, a benzophenone derivative, anthraquinone, an anthraquinone derivative, benzile, a benzile derivative, thioxanthone, a thioxanthone derivative, xanthone, a xanthone derivative, a benzoin ether, a benzoin ether derivative, an alpha-ketol, an alpha-ketol derivative, and combinations thereof.

Clause 43. The acrylic polymer of any one of Clauses 1 to 42 wherein the reactive functional group is selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

Clause 44. The acrylic polymer of any one of Clauses 1 to 43 wherein the reactive functional group is an acid.

Clause 45. The acrylic polymer of any one of Clauses 1 to 44 wherein the acrylic polymer has a polydispersity greater than 3.0.

Clause 46. The acrylic polymer of any one of Clauses 1 to 45 wherein the acrylic polymer has a number average molecular weight (Mn) within a range of from about 5,000 g/mol to about 150,000 g/mol.

Clause 47. The acrylic polymer of any one of Clauses 1 to 46 comprising two first reactive segments A and one second segment B.

Clause 48. The acrylic polymer of Clause 47 wherein the segments A are positioned on either side of the middle segment B on the polymer chain to define an ABA structure.

Clause 49. The acrylic polymer of any one of Clauses 1 to 46 comprising two second segments B and one first reactive segment A.

Clause 50. The acrylic polymer of Clause 49 wherein the blocks B are positioned on either side of the middle block A on the polymer chain to define a BAB structure.

Clause 51. An acrylic polymer comprising:
at least one acrylic block copolymer including
a first reactive segment of controlled molecular weight and position that includes at least one monomer having a functional group selected from the group consisting of a UV active functional group, a reactive functional group, a non-reactive functional group, and combinations thereof; and
a second segment of controlled molecular weight and position that includes at least one monomer having a functional group selected from the group consisting of a reactive functional group, a non-reactive functional group, and combinations thereof,
wherein the first reactive segment includes at least one monomer having a non-reactive functional group and at least one polymerizable comonomer having a crosslinkable functionality, the crosslinkable functionality selected from the group consisting of a UV active functional group, a reactive functional group, and combinations thereof.

Clause 52. The acrylic polymer of Clause 51 wherein the first reactive segment includes a copolymer derived from one or more of the monomers of the second segment and at least one polymerizable comonomer having a crosslinkable functionality, the crosslinkable functionality selected from the group consisting of a UV active functional group, a reactive functional group, and combinations thereof.

Clause 53. The acrylic polymer of Clauses 51 or 52 wherein the at least one monomer having a non-reactive functional group within the first reactive segment is the same type of monomer having a non-reactive functional group present in the second reactive segment.

Clause 54. The acrylic polymer of any one of Clauses 51 to 53 wherein the acrylic polymer is a homogeneous polymer prior to crosslinking.

Clause 55. The acrylic polymer of any one of Clauses 51 to 54 wherein the first reactive segment comprises 40% or less of the total polymer molecular weight.

Clause 56. The acrylic polymer of any one of Clauses 51 to 55 wherein the at least one monomer having a UV active functional group is about 10% or less by weight of the total polymer weight.

Clause 57. The acrylic polymer of any one of Clauses 51 to 56 wherein the first reactive segment includes about 40% to about 99% by weight of the at least one monomer having a non-reactive functional group.

Clause 58. A pressure sensitive adhesive composition comprising:
the acrylic polymer of any one of Clauses 1 to 50 or Clauses 51 to 57; and
a crosslinking agent.

Clause 59. The adhesive composition of Clause 58 wherein the crosslinking agent is from about 0.05% to about 5% by weight of adhesive solids.

Clause 60. The adhesive composition of Clauses 58 or 59 wherein the crosslinking agent is activated using one of heat, actinic radiation, electron beam radiation, and a metal based catalyst.

Clause 61. The adhesive composition of any one of Clauses 58 to 60 wherein the adhesive composition further comprises at least one agent selected from the group consisting of tackifiers, plasticizers, antioxidants, pH controllers, medicaments, bactericides, growth factors, wound healing components, deodorants, perfumes, antimicrobials, fungicides, cutting agents, pigments, filler, diluents, flame retardants, and combinations thereof.

Clause 62. The adhesive composition of any one of Clauses 58 to 61 wherein the weight percentage of solids is greater than 50%.

Clause 63. The adhesive composition of any one of Clauses 58 to 62 wherein the adhesive exhibits an elastic/storage modulus (G') of less than the Dahlquist criterion value of $3 \times 10^6$ dynes/cm$^2$ ($3 \times 10^5$ Pa) at room temperature.

Clause 64. The adhesive composition of any one of Clauses 58 to 63 wherein the glass transition temperature (Tg) of the adhesive composition is within a range of from about 15° C. to about −115° C.

Clause 65. A method of preparing a pressure sensitive adhesive composition comprising:
polymerizing using a controlled radical polymerization process at least one monomer having a functional group selected from the group consisting of a UV active functional group, a reactive functional group, a non-reactive functional group, and combinations thereof to thereby form a first reactive segment of controlled molecular weight and position;
polymerizing using a controlled radical polymerization process at least one monomer having a functional group selected from the group consisting of a reactive functional group, a non-reactive functional group, and combinations thereof to thereby form a second segment of controlled molecular weight and position;
forming an acrylic polymer from the first reactive segment and the second segment; and
crosslinking the acrylic polymer by mixing the acrylic polymer with an amount of a crosslinking agent.

Clause 66. The method of Clause 65 wherein at least one of the first reactive segment and the second segment is polymerized in the presence of a RAFT agent.

Clause 67. The method of Clause 65 or 66 wherein at least one of the first reactive segment and the second segment is polymerized in the presence of an SFRP agent.

Clause 68. An adhesive article comprising:
a substrate; and
the adhesive of any one of Clauses 58 to 64 disposed on the substrate.

Clause 69. The adhesive article of Clause 68 wherein the article is in the form of a tape.

Clause 70. An acrylic polymer consisting of:
at least one acrylic block copolymer having
a first reactive segment of controlled molecular weight and position consisting of at least one monomer having a UV active functional group, at least one monomer having a reactive functional group, and at least one monomer having a non-reactive functional group; and
a second segment of controlled molecular weight and position consisting of at least one monomer having a reactive functional group, and at least one monomer having a non-reactive functional group.

Clause 71. The acrylic polymer of Clause 70 wherein the first reactive segment consists of at least one monomer having a non-reactive functional group and at least one polymerizable comonomer having a crosslinkable functionality, the crosslinkable functionality consisting of a UV active functional group and a reactive functional group.

Clause 72. The acrylic polymer of Clauses 70 or 71 wherein the first reactive segment consists of a copolymer derived from one or more of the monomers of the second segment and at least one polymerizable comonomer having a crosslinkable functionality, the crosslinkable functionality consisting of a UV active functional group and a reactive functional group.

Clause 73. The acrylic polymer of any one of Clauses 70 to 72 wherein the at least one monomer having a non-reactive functional group within the first reactive segment is the same type of monomer having a non-reactive functional group present in the second reactive segment.

Clause 74. The acrylic polymer of any one of Clauses 70 to 73 wherein the acrylic polymer is a homogeneous polymer prior to crosslinking.

Clause 75. The acrylic polymer of any one of Clauses 70 to 74 wherein the first reactive segment is about 40% or less of the total polymer molecular weight.

Clause 76. The acrylic polymer of any one of Clauses 70 to 75 wherein the at least one monomer having a UV active functional group is about 10% or less by weight of the total polymer weight.

Clause 77. The acrylic polymer of any one of Clauses 70 to 76 wherein the first reactive segment includes about 40% to about 99% by weight of the at least one monomer having a non-reactive functional group.

Clause 78. A pressure sensitive adhesive composition consisting of:
the acrylic polymer of any one of Clauses 70 to 77; and
a crosslinking agent.

Clause 79. The adhesive composition of Clause 78 wherein the crosslinking agent is from about 0.05% to about 5% by weight of adhesive solids.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

As described hereinabove, the present subject matter solves many problems associated with previously known compositions and methods. However, it will be appreciated that various changes in the details, materials and arrangements of components and/or operations, which have been herein described and illustrated in order to explain the nature of the subject matter, may be made by those skilled in the art without departing from the principle and scope of the subject matter as expressed in the appended claims.

What is claimed is:

1. An acrylic polymer comprising:
   at least one acrylic block copolymer comprising
   a first reactive segment of controlled molecular weight and position that comprises at least one monomer comprising a functional group selected from the group consisting of a UV active functional group, a reactive functional group, a non-reactive functional group, and combinations thereof; and
   a second segment of controlled molecular weight and position that comprises at least one monomer comprising a functional group selected from the group consisting of a reactive functional group, a non-reactive functional group, and combinations thereof,
   wherein the first reactive segment comprises at least one monomer comprising a UV active functional group, and
   wherein the first reactive segment and the second segment are molecularly miscible before cure as expressed by their properties on the bulk state that are indicative of a single phase polymer.

2. The acrylic polymer of claim 1 wherein the first reactive segment comprises at least one monomer comprising a UV active functional group, and at least one monomer comprising a non-reactive functional group.

3. The acrylic polymer of claim 1 wherein the first reactive segment comprises at least one monomer comprising a UV active functional group and at least one monomer comprising a non-reactive functional group.

4. The acrylic polymer of claim 1 wherein the second segment comprises at least one monomer comprising a reactive functional group and at least one monomer comprising a non-reactive functional group.

5. The acrylic polymer of claim 1 wherein the second segment comprises at least one monomer comprising a non-reactive functional group.

6. The acrylic polymer of claim 1 wherein the first reactive segment comprises at least one monomer comprising a non-reactive functional group and at least one polymerizable comonomer comprising a crosslinkable functionality, the crosslinkable functionality selected from the group consisting of a UV active functional group, a reactive functional group, and combinations thereof.

7. The acrylic polymer of claim 1 wherein the first reactive segment comprises at least one monomer comprising a non-reactive functional group and at least one polymerizable comonomer comprising a crosslinkable functionality, the crosslinkable functionality is a UV crosslinkable functional group.

8. The acrylic polymer of claim 1 wherein the at least one monomer comprising non-reactive functional group within the first reactive segment is the same monomer comprising a non-reactive functional group present in the second segment.

9. The acrylic polymer of claim 1 wherein the at least one monomer comprising a reactive functional group within the first reactive segment is the same monomer comprising a reactive functional group present in the second segment.

10. The acrylic polymer of claim 1 wherein the at least one monomer comprising a reactive functional group comprises at least one monomer derived from the formula (II):

where R is H or $CH_3$ and X comprises a functional group capable of crosslinking,
wherein the functional group comprises at least one functional group selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

11. The acrylic polymer of claim 1 wherein the at least one monomer comprising a non-reactive functional group comprises at least one monomer derived from the formula (I):

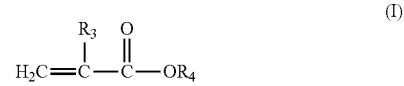

where $R_3$ is H or $CH_3$ and $R_4$ is a branched or unbranched, saturated alkyl group comprising 4 to 14 carbon atoms.

12. The acrylic polymer of claim 1 wherein the at least one monomer comprising a non-reactive functional group is derived from $C_1$ to about $C_{20}$ alkyl, aryl, or cyclic acrylates or $C_1$ to about $C_{20}$ alkyl, aryl, or cyclic methacrylates.

13. The acrylic polymer of claim 1 wherein the first reactive segment comprises about 40% to about 99% by weight of the at least one monomer comprising a non-reactive functional group.

14. The acrylic polymer of claim 1 wherein the at least one monomer comprising a UV active functional group is about 10% or less by weight of the total polymer weight.

15. The acrylic polymer of claim 1 wherein the second segment is non-reactive with the UV active functional group and/or the reactive functional group.

16. The acrylic polymer of claim 1 wherein the at least one monomer comprising a non-reactive functional group is non-reactive with the UV active functional group and/or the reactive functional group.

17. The acrylic polymer of claim 1 wherein the first reactive segment and the second segment are positioned adjacent to the polymer chain ends.

18. The acrylic polymer of claim 1 wherein the reactive functional groups and/or the non-reactive functional groups are randomly spaced apart along the length of the polymer chain.

19. The acrylic polymer of claim 1 wherein the first reactive segment comprises 40% or less of the total polymer molecular weight.

20. The acrylic polymer of claim 1 wherein the acrylic polymer is a single phase polymer at room temperature.

21. The acrylic polymer of claim 1 wherein the acrylic polymer is a single phase polymer prior to crosslinking.

22. The acrylic polymer of claim 1 wherein the acrylic polymer is a single phase liquid polymer at room temperature.

23. The acrylic polymer of claim 1 wherein the acrylic polymer is a single phase liquid polymer prior to crosslinking.

24. The acrylic polymer of claim 1 wherein the acrylic polymer is a liquid polymer at room temperature.

25. The acrylic polymer of claim 1 wherein the acrylic polymer is a liquid polymer prior to crosslinking.

26. The acrylic polymer of claim 1 wherein the acrylic polymer is a homogeneous polymer at room temperature.

27. The acrylic polymer of claim 1 wherein the acrylic polymer is a homogeneous polymer prior to crosslinking.

28. The acrylic polymer of claim 1 wherein the acrylic polymer is a homogeneous liquid polymer prior to crosslinking.

29. The acrylic polymer of claim 1 wherein the acrylic polymer is a homogeneous liquid polymer at room temperature.

30. The acrylic polymer of claim 1 wherein the acrylic polymer exhibits no heterogeneity prior to crosslinking.

31. The acrylic polymer of claim 1 wherein the acrylic polymer exhibits no heterogeneity at room temperature.

32. The acrylic polymer of claim 1 wherein the glass transition temperature (Tg) of the acrylic polymer is within a range of from about 15° C. to about −115° C.

33. The acrylic polymer of claim 1 wherein the UV active functional group is selected from the group consisting of benzophenones, double bonds, and combinations thereof.

34. The acrylic polymer of claim 1 wherein the UV active functional group is a benzophenone.

35. The acrylic polymer of claim 1 wherein the UV active functional group is represented by Formula (III) as follows:

in which $R_1$ and $R_2$ is each independently an organic radical selected from the group consisting of methyl, aryl, and alkyl.

36. The acrylic polymer of claim 35 wherein $R_1$ and $R_2$ is each independently an aromatic or substituted aromatic group.

37. The acrylic polymer of claim 35 wherein $R_1$ and $R_2$ is each independently a phenyl or substituted phenyl group.

38. The acrylic polymer of claim 1 wherein the UV active functional group is selected from the group consisting of acetophenone, an acetophenone derivative, benzophenone, a benzophenone derivative, anthraquinone, an anthraquinone derivative, benzile, a benzile derivative, thioxanthone, a thioxanthone derivative, xanthone, a xanthone derivative, a benzoin ether, a benzoin ether derivative, an alpha-ketol, an alpha-ketol derivative, and combinations thereof.

39. The acrylic polymer of claim 1 wherein the reactive functional group is selected from the group consisting of hydroxyl, carboxyl, carbonyl, carbonate ester, isocyanate, epoxy, vinyl, amine, amide, imide, anhydride, mercapto (thiol), acid, acrylamide, acetoacetyl groups, alkoxymethylol, cyclic ether groups, and combinations thereof.

40. The acrylic polymer of claim 1 wherein the reactive functional group is an acid.

41. The acrylic polymer of claim 1 wherein the acrylic polymer has a polydispersity greater than 3.0.

42. The acrylic polymer of claim 1 wherein the acrylic polymer has a number average molecular weight (Mn) within a range of from about 5,000 g/mol to about 150,000 g/mol.

43. The acrylic polymer of claim 1 comprising two first reactive segments A and one second segment B.

44. The acrylic polymer of claim 43 wherein the segments A are positioned on either side of the middle segment B on the polymer chain to define an ABA structure.

45. The acrylic polymer of claim 1 comprising two second segments B and one first reactive segment A.

46. The acrylic polymer of claim 45 wherein the blocks B are positioned on either side of the middle block A on the polymer chain to define a BAB structure.

47. An acrylic polymer comprising:
at least one acrylic block copolymer comprising
a first reactive segment of controlled molecular weight and position that comprises at least one monomer comprising a functional group selected from the group consisting of a UV active functional group, a reactive functional group, a non-reactive functional group, and combinations thereof; and
a second segment of controlled molecular weight and position that comprises at least one monomer comprising a functional group selected from the group consisting of a reactive functional group, a non-reactive functional group, and combinations thereof,
wherein the first reactive segment and the second segment comprise a copolymer derived from (i) at least one monomer comprising a non-reactive functional group and (ii) at least one polymerizable comonomer comprising a crosslinkable functionality,
wherein the first reactive segment comprises at least one monomer comprising a UV active functional group, and
wherein the first segment and the second segment are molecularly miscible before cure as expressed by their properties in the bulk state that are indicative of a single phase polymer.

48. The acrylic polymer of claim 47 wherein the at least one monomer comprising a non-reactive functional group within the first reactive segment is the same monomer comprising a non-reactive functional group present in the second segment.

49. The acrylic polymer of claim 47 wherein the acrylic polymer is a homogeneous polymer prior to crosslinking.

50. The acrylic polymer of claim 47 wherein the first reactive segment comprises 40% or less of the total polymer molecular weight.

51. The acrylic polymer of claim 47 wherein the at least one monomer comprising a UV active functional group is about 10% or less by weight of the total polymer weight.

52. The acrylic polymer of claim 47 wherein the first reactive segment comprises about 40% to about 99% by weight of the at least one monomer comprising a non-reactive functional group.

53. A pressure sensitive adhesive composition comprising:
the acrylic polymer of claim 1; and
a crosslinking agent.

54. The adhesive composition of claim 53 wherein the crosslinking agent is from about 0.05% to about 5% by weight of adhesive solids.

55. The adhesive composition of claim 53 wherein the crosslinking agent is activated using one of heat, actinic radiation, electron beam radiation, and a metal based catalyst.

56. The adhesive composition of claim 53 wherein the adhesive composition further comprises at least one agent selected from the group consisting of tackifiers, plasticizers, antioxidants, pH controllers, medicaments, bactericides, growth factors, wound healing components, deodorants, perfumes, antimicrobials, fungicides, cutting agents, pigments, filler, diluents, flame retardants, and combinations thereof.

57. The adhesive composition of claim 53 wherein the weight percentage of solids is greater than 50%.

58. The adhesive composition of claim 53 wherein the adhesive exhibits an elastic/storage modulus (G') of less than the Dahlquist criterion value of $3 \times 10^6$ dynes/cm$^2$ ($3 \times 10^5$ Pa) at room temperature.

59. The adhesive composition of claim 53 wherein the glass transition temperature (Tg) of the adhesive composition is within a range of from about 15° C. to about −115° C.

60. A method of preparing a pressure sensitive adhesive composition comprising:
polymerizing using a controlled radical polymerization process at least one monomer comprising a functional group selected from the group consisting of a UV active functional group, a reactive functional group, a non-reactive functional group, and combinations thereof to thereby form a first reactive segment of controlled molecular weight and position;
polymerizing using a controlled radical polymerization process at least one monomer comprising a functional group selected from the group consisting of a reactive functional group, a non-reactive functional group, and combinations thereof to thereby form a second segment of controlled molecular weight and position;
forming an acrylic polymer from the first reactive segment and the second segment; and
crosslinking the acrylic polymer by mixing the acrylic polymer with an amount of a crosslinking agent,
wherein the first reactive segment comprises at least one monomer comprising a UV active functional group, and
wherein the first reactive segment and the second segment are molecularly miscible before cure as expressed by their properties in the bulk state that are indicative of a single phase polymer.

61. The method of claim 60 wherein at least one of the first reactive segment and the second segment is polymerized in the presence of a RAFT agent.

62. The method of claim 60 wherein at least one of the first reactive segment and the second segment is polymerized in the presence of an SFRP agent.

63. An adhesive article comprising:
a substrate; and
the adhesive of claim 53 disposed on the substrate.

64. The adhesive article of claim 63 wherein the article is in the form of a tape.

65. An acrylic polymer consisting of:
at least one acrylic block copolymer comprising
a first reactive segment of controlled molecular weight and position consisting of at least one monomer comprising a UV active functional group, at least one monomer comprising a reactive functional group, and at least one monomer comprising a non-reactive functional group; and
a second segment of controlled molecular weight and position consisting of at least one monomer comprising a reactive functional group, and at least one monomer comprising a non-reactive functional group,
wherein the first reactive segment comprises at least one monomer comprising a UV active functional group, and
wherein the first reactive segment and the second segment are molecularly miscible before cure as expressed by their properties in the bulk state that are indicative of a single phase polymer.

66. The acrylic polymer of claim 65 wherein the first reactive segment consists of at least one monomer comprising a non-reactive functional group and at least one polymerizable comonomer comprising a crosslinkable functionality, the crosslinkable functionality consisting of a UV crosslinkable functional group and a reactive functional group.

67. The acrylic polymer of claim 65 wherein the first reactive segment consists of a copolymer derived from one or more of the monomers of the second segment and at least one polymerizable comonomer comprising a crosslinkable functionality, the crosslinkable functionality consisting of a UV crosslinkable functional group and a reactive functional group.

68. The acrylic polymer of claim 65 wherein the at least one monomer comprising a non-reactive functional group within the first reactive segment is the same monomer comprising a non-reactive functional group present in the second segment.

69. The acrylic polymer of claim 65 wherein the acrylic polymer is a homogeneous polymer prior to crosslinking.

70. The acrylic polymer of claim 65 wherein the first reactive segment is about 40% or less of the total polymer molecular weight.

71. The acrylic polymer of claim 65 wherein the at least one monomer comprising a UV active functional group is about 10% or less by weight of the total polymer weight.

72. The acrylic polymer of claim 65 wherein the first reactive segment comprises about 40% to about 99% by weight of the at least one monomer comprising a non-reactive functional group.

73. A pressure sensitive adhesive composition consisting of:
the acrylic polymer of claim 65; and
a crosslinking agent.

74. The adhesive composition of claim 73 wherein the crosslinking agent is from about 0.05% to about 5% by weight of adhesive solids.

* * * * *